(12) United States Patent
Morita et al.

(10) Patent No.: US 7,740,819 B2
(45) Date of Patent: Jun. 22, 2010

(54) PROCESS FOR PURIFICATION OF EXHAUST GASES AND CATALYST USED FOR PURIFICATION OF EXHAUST GASES IN THIS PROCESS

(75) Inventors: Atsushi Morita, Kakogawa (JP); Junji Okamura, Himeji (JP); Shinyuki Masaki, Himeji (JP); Noboru Sugishima, Himeji (JP); Motonobu Kobayashi, Himeji (JP)

(73) Assignee: Nippon Shokubai Co., Ltd., Tokyo (JP)

( * ) Notice: Subject to any disclaimer, the term of this patent is extended or adjusted under 35 U.S.C. 154(b) by 528 days.

(21) Appl. No.: 10/354,201

(22) Filed: Jan. 30, 2003

(65) Prior Publication Data
US 2003/0170160 A1 Sep. 11, 2003

(30) Foreign Application Priority Data
Feb. 26, 2002 (JP) .............................. 2002-050240

(51) Int. Cl.
*B01D 53/56* (2006.01)
(52) U.S. Cl. .................... 423/247; 423/239.1; 502/330; 502/332; 502/527.19
(58) Field of Classification Search ................. 423/247, 423/239.1; 502/330, 332, 527.19
See application file for complete search history.

(56) References Cited

U.S. PATENT DOCUMENTS 3,886,260 A * 5/1975 Unland .................... 423/213.5
4,323,542 A * 4/1982 Joy, III .................... 423/213.5
4,350,613 A * 9/1982 Nishino et al. .............. 502/200
5,047,378 A * 9/1991 Kato et al. .................... 502/74
5,082,820 A * 1/1992 Mitsui et al. ................. 502/350

(Continued)

FOREIGN PATENT DOCUMENTS
EP  0 473 396 A1  3/1992
(Continued)

OTHER PUBLICATIONS

Anderson J.R. et al: "Catalysis Science and Technology, vol. 3", Springer, Berlin, Germany XP002242856, p. 108, line 13—p. 108, line 30.

*Primary Examiner*—Stanley Silverman
*Assistant Examiner*—Paul A Wartalowicz
(74) *Attorney, Agent, or Firm*—Roylance, Abrams, Berdo & Goodman, L.L.P.

(57) ABSTRACT

The present invention has an object to more enhance the efficiency of the purification of the CO-containing exhaust gases with a catalytic-component-supporting type catalyst, particularly, to enable both achievement of high purification efficiency and long-term stable maintenance of high purification efficiency without increasing the quantity of the catalytic component as supported. As a means of achieving this object, a process for purification of exhaust gases, according to the present invention, is a process for purification of exhaust gases to remove CO therefrom, and is characterized by comprising the step of bringing the exhaust gases into contact with a catalyst layer at a temperature of 250 to 600° C., a pressure drop of not more than 100 mmH$_2$O, and a linear velocity of 0.5 to 10 m/s, wherein the catalyst layer includes a honeycomb-structural catalyst having an opening size of 1.0 to 3.0 mm, an opening ratio of 60 to 80%, and an inner wall thickness of less than 2 mm.

14 Claims, 3 Drawing Sheets

U.S. PATENT DOCUMENTS

| | | | | |
|---|---|---|---|---|
| 5,137,855 | A | * 8/1992 | Hegedus et al. | 502/84 |
| 5,431,893 | A | 7/1995 | Hug et al. | |
| 5,577,383 | A | * 11/1996 | Kuroda et al. | 60/284 |
| 5,601,792 | A | 2/1997 | Hug et al. | |
| 5,628,975 | A | * 5/1997 | Horiuchi et al. | 423/213.2 |
| 5,928,981 | A | 7/1999 | Leyrer et al. | |
| 5,948,377 | A | * 9/1999 | Sung | 423/213.5 |
| 6,037,307 | A | * 3/2000 | Campbell et al. | 502/325 |
| 6,667,017 | B2 | * 12/2003 | Murrell et al. | 423/210 |

FOREIGN PATENT DOCUMENTS

| | | |
|---|---|---|
| JP | 50-91586 | 7/1975 |
| JP | 53-89874 | 8/1978 |
| JP | 53-146991 | 12/1978 |
| JP | 56-51245 | 5/1981 |
| JP | 60-220148 | 11/1985 |
| JP | 62-65721 | 3/1987 |
| JP | 62-183842 | 8/1987 |
| JP | 2-229547 | 9/1990 |
| JP | 4-250851 | 9/1992 |
| JP | 6-4126 | 1/1994 |
| JP | 7-241467 | 9/1995 |
| JP | 7-241468 | 9/1995 |
| JP | 6-7643 | 1/1997 |
| JP | 9-103648 | 4/1997 |
| JP | 9-253491 | 9/1997 |
| JP | 10-235206 | 9/1998 |
| JP | 11-114419 | 4/1999 |
| JP | 2000-288347 | 10/2000 |
| JP | 2001-62292 | 3/2001 |
| JP | 2001-286751 | 10/2001 |
| JP | 2001-518001 | 10/2001 |
| WO | WO 97/11769 | 4/1997 |

* cited by examiner

US 7,740,819 B2

PROCESS FOR PURIFICATION OF EXHAUST GASES AND CATALYST USED FOR PURIFICATION OF EXHAUST GASES IN THIS PROCESS

BACKGROUND OF THE INVENTION

A. Technical Field

The present invention relates to a process for purification of exhaust gases and a catalyst used for purification of exhaust gases in this purification process. Specifically, the present invention aims at: a process for purification of exhaust gases to efficiently purify carbon monoxide (CO) as contained in exhaust gases as discharged from such as various combustion apparatuses such as boilers, gas turbines, diesel engines, and gas engines; and a catalyst usable for purification of exhaust gases in such a purification process.

B. Background Art

The combustion exhaust gases, as discharged from various combustion apparatuses such as boilers, gas turbines, diesel engines, and gas engines, generally contain harmful components such as CO, $NO_x$, $SO_x$, and unburned-fuel-derived volatile organic compounds, though depending on such as their respective combustion apparatuses and operational conditions. As to these combustion apparatuses, there are many cases where combustion is carried out under conditions where the quantity of air as supplied during combustion is rendered larger than the theoretical air quantity necessary for perfect combustion of fuel gases in order that the combustion efficiency or thermal efficiency may be enhanced and further that the quantities of harmful components such as CO and $NO_x$ may efficiently be decreased. The quantities of the harmful components such as CO and $NO_x$ as contained in the combustion exhaust gases can considerably be decreased by such as the above control of the combustion state, but such as CO and $NO_x$ still remain on a level recognized as harmful. Therefore, these residual harmful components need to also efficiently be purified, so it becomes necessary to develop a catalyst for purification of exhaust gases and a process for purification of exhaust gases which are able to function effectively on a higher level of purification. Specifically, these combustion exhaust gases contain a large quantity of oxygen, corresponding to the excessive air quantity, and a large quantity of water vapor resultant from combustion, so the purification of the harmful components such as CO and $NO_x$ as contained in the combustion exhaust gases needs development of a catalyst for purification of exhaust gases and a process for purification of exhaust gases which are able to function still effectively even if the combustion exhaust gases contain the above large quantity of oxygen and the above large quantity of water vapor resultant from combustion.

Hitherto for purification of combustion exhaust gases as discharged from combustion apparatuses for combustion under conditions near the theoretical air ratio to fuel, for example, a trinary catalyst such as Pt, Rh/alumina catalyst is proposed and a process for purification of exhaust gases with this catalyst is actually put to practical use. This process for purification of exhaust gases is carried out by passing the above exhaust gases through the Pt, Rh/alumina catalyst (honeycomb catalyst) under conditions of about 500 to about 700° C., whereby CO, $NO_x$, and the unburned volatile organic compounds are removed from the exhaust gases.

However, the above process for purification of exhaust gases targets almost oxygen-free exhaust gases for purification and also has a premise of being carried out under conditions where the purification temperature is in the range of about 500 to about 700° C., and the above catalyst can sufficiently display its function in such a purification environment. Therefore, the above catalyst cannot adapt effectively to or sufficiently display its function in a process for purification of exhaust gases which process targets, for purification, exhaust gases that contain oxygen and water vapor in large quantities and are discharged at an exhaust gas temperature of about 300 to about 500° C., and which process is intended to remove the harmful components such as CO.

On the other hand, as to processes for purification of exhaust gases as intended for making such as CO in the exhaust gases harmless wherein the exhaust gases are discharged at a temperature of about 300 to about 500° C. and contain oxygen and/or water vapor in large quantities, for example, there are known such processes as disclosed in JP-A-241467/1995 and JP-A-241468/1995 for oxidation removal of CO from exhaust gases of dilute combustion gas engines. Specifically, JP-A-241467/1995 discloses a catalyst and a process for making the CO in the exhaust gases of the dilute combustion gas engines harmless by oxidation, and these are characterized in that the catalyst as used is a Pt/alumina catalyst as supported on a honeycomb support wherein the quantity of the supported Pt is in the range of 1.2 to 2.5 g/liter. On the other hand, JP-A-241468/1995 discloses a catalyst and a process for making the CO in the exhaust gases of the dilute combustion gas engines harmless by oxidation, and these are characterized in that the catalyst as used is a Pt, Pd/alumina or Pt, Rh/alumina catalyst as supported on a honeycomb support.

As to the technique as disclosed in JP-A-241467/1995, long-term stable effective oxidation removal of the CO from the exhaust gases, as discharged from the dilute combustion gas engines, needs to set the quantity of the Pt, as supported on the honeycomb support along with the alumina, in the range of 1.2 to 2.5 g/liter and, in the case where the quantity of the supported Pt is decreased to not larger than 1 g/liter, the long-term stable effective oxidation removal of the CO from the exhaust gases is impossible. In addition, the technique as disclosed in JP-A-241468/1995 reports that if the Pt/alumina catalyst as supported on the honeycomb support is replaced with the Pt, Pd/alumina or Pt, Rh/alumina catalyst as supported on the honeycomb support, then the quantity of the supported Pt can be selected without the problems of the technique of JP-A-241467/1995, specifically, the restriction such that the quantity of the supported Pt must be increased into a certain specific range for the purpose of the long-term stable effective oxidation removal of the CO from the exhaust gases. However, it is necessary therefor to support the Pd and Rh, which are expensive noble metals similar to the Pt, in almost the same quantity as of the Pt.

As to a CO removal catalyst on which a noble metal is supported, if the quantity of the noble metal as supported is increased, the catalytic function is expected to be enhanced, but the cost of the noble metal as a material rises correspondingly to the increase of the supporting quantity, so the economical performance is inferior. Furthermore, in the case where the exhaust gases contain $SO_x$, the conversion of $SO_2 \rightarrow SO_3$ is so high that there occur problems of such as corrosion of piping by $SO_3$, and further that the catalytic performance is greatly deteriorated by $SO_3$.

SUMMARY OF THE INVENTION

A. Object of the Invention

An object of the present invention is to more enhance the efficiency of the purification of the CO-containing exhaust gases with the aforementioned catalytic-component-supporting type catalyst, particularly, to enable both achievement of high purification efficiency and long-term stable maintenance of high purification efficiency without increasing the quantity of the catalytic component as supported.

B. Disclosure of the Invention

As a result of diligent study to solve the above problems, the present inventors have completed the present invention by verifying that, when purifying the CO-containing exhaust gases, the following process for purification of exhaust gases and the following catalyst used for purification of exhaust gases in this purification process could solve the above problems all at once wherein the process comprises the step of bringing the CO-containing exhaust gases into contact with and passing the CO-containing exhaust gases through a catalyst layer under specific conditions, wherein the catalyst layer includes a honeycomb-structural catalyst having a specific structure.

In addition, as to the occasion when CO-containing exhaust gases which further contain $NO_x$ are purified, the present inventors have found out that $NO_x$ can also efficiently be removed and purified along with CO if the above exhaust gases are brought into contact with the above catalyst layer as referred to in the above process for purification of exhaust gases according to the present invention, or if, before and/or after this contact step, the above exhaust gases are further brought into contact with a catalyst for removal of nitrogen oxides (hereinafter, referred to as $DeNO_x$ catalyst) in the presence of a reducing agent; and thus the present inventors have completed the present invention by verifying that the above problems can be solved all at once in such a way.

That is to say, a process for purification of exhaust gases, according to the present invention, is a process for purification of exhaust gases to remove CO therefrom, and is characterized by being a process comprising the step of bringing the exhaust gases into contact with a catalyst layer at a temperature of 250 to 600° C., a pressure drop of not more than 100 mmH$_2$O, and a linear velocity of 0.5 to 10 m/s, wherein the catalyst layer includes a honeycomb-structural catalyst having an opening size of 1.0 to 3.0 mm, an opening ratio of 60 to 80%, and an inner wall thickness of less than 2 mm.

In addition, as to the above process for purification of exhaust gases according to the present invention, there can be made any one or any combination of the following modifications or limitations:

the catalyst includes a honeycomb support and a catalytic component supported thereon, and has a length of 25 to 300 mm in a gas flow direction, wherein surface layers of at least 0.01 mm of inner walls of the honeycomb support are porous, and wherein the catalytic component includes a catalytic component A supported in the porous surface layers wherein the catalytic component A includes at least one noble metal element selected from the group consisting of Pt, Pd, Rh, Ru, Ir, and Au;

the honeycomb support is a monolithically molded type porous honeycomb support which is obtained by a process including the steps of extrusion-molding and then calcining materials of the support;

the catalytic component in the catalyst further includes a catalytic component B supported in the porous surface layers wherein the catalytic component B includes at least one metal element as included in groups I to III in a periodic table;

the catalytic component in the catalyst further includes a catalytic component C supported in the porous surface layers wherein the catalytic component C includes at least one element selected from the group consisting of V, W, Mo, Cu, Mn, Ni, Co, Cr, and Fe;

the porous surface layers have a total pore volume of 0.20 to 0.80 cm$^3$/g as measured by the mercury penetration method and an average pore diameter of 0.010 to 0.50 μm;

the porous surface layers have a specific surface area of not less than 20 m$^2$/g as measured by the BET method;

the porous surface layers include a titanium-containing oxide;

the titanium-containing oxide has an anatase type crystal structure;

the titanium-containing oxide includes titanium oxide and/or a composite oxide of Ti and at least one metal element selected from the group consisting of Si, Al, W, and Zr;

the catalyst has an inner wall thickness of 0.1 to 0.5 mm and a length of 50 to 200 mm in a gas flow direction;

the catalyst has a compression fracture strength of not less than 0.3 MPa;

the catalyst further includes a compound of at least one element selected from the group consisting of P, B, Sb, Pb, Sn, Zn, and In in the range of not more than 10 weight % in terms of atom of the selected element relative to the entity of the catalyst;

the catalyst further includes at least one member selected from the group consisting of glass fibers, whiskers, and silica particles;

the exhaust gases further contains $NO_x$; and in the case where the exhaust gases further contains $NO_x$, it is favorable that the process further comprises the step of bringing the exhaust gases into contact with a catalyst for removal of nitrogen oxides in the presence of a reducing agent before and/or after the step of bringing the exhaust gases into contact with the catalyst layer.

Even if the exhaust gases are exhaust gases having a CO concentration of not higher than 100 ppm, the aforementioned process for purification of exhaust gases according to the present invention can sufficiently remove this low-concentration CO.

In addition, a catalyst for purification of exhaust gases, according to the present invention, is characterized by being a catalyst which is used in the above process for purification of exhaust gases according to the present invention.

These and other objects and the advantages of the present invention will be more fully apparent from the following detailed disclosure.

EXPLANATION OF THE SYMBOLS

Figure 1:
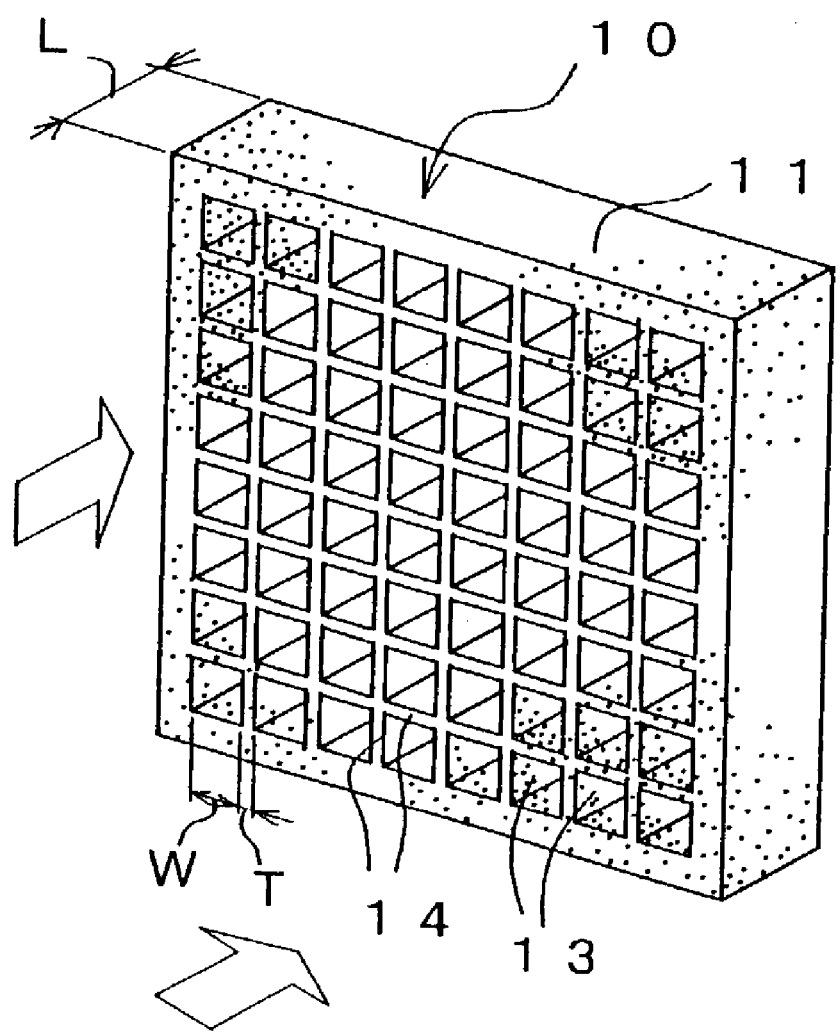
FIG. 1 is a perspective of a catalyst for purification of exhaust gases showing a mode for carrying out the present invention.

10: Catalyst for purification of exhaust gases (honeycomb catalyst)
11: Porous honeycomb support
13: Gas passageway
14: Inner wall

DETAILED DESCRIPTION OF THE INVENTION

Hereinafter, detailed explanations are made about the process for purification of exhaust gases according to the present invention and the catalyst used for purification of exhaust gases in this process, but the scope of the present invention is not bound to these explanations, and modes other than the below-mentioned examples can also be modified and carried out fittingly within the range not damaging the spirit of the present invention.

The process for purification of exhaust gases, according to the present invention, is a process for purification of CO-containing exhaust gases to remove CO therefrom, and is arranged to comprise the step of bringing the above CO-containing exhaust gases into contact with a catalyst layer at a temperature of 250 to 600° C., a pressure drop of not more than 100 mmH$_2$O, and a linear velocity of 0.5 to 10 m/s to remove CO from the exhaust gases, wherein the catalyst layer includes a honeycomb-structural catalyst (which may hereinafter be referred to as honeycomb catalyst) having an opening size of 1.0 to 3.0 mm, an opening ratio of 60 to 80%, and an inner wall thickness of less than 2 mm.

Hereinafter, detailed explanations are made about the CO-containing exhaust gases and the catalyst for purification of exhaust gases which can be targeted for purification and used respectively when the process for purification of exhaust gases according to the present invention is carried out, and subsequently, detailed explanations are made about the process for purification of exhaust gases along with its purification conditions and specific operations.

(CO-Containing Exhaust Gases):

The process for purification of exhaust gases, according to the present invention, is applicable to carbon monoxide (CO)-containing exhaust gases as discharged from conventional various industrial apparatuses and facilities (hereinafter referred to as supplying sources), specifically, combustion exhaust gases from such as boilers, gas turbines, diesel engines, gas engines, heating furnaces, and various industrial processes.

Components, which are contained in the combustion exhaust gases, differ according to the aforementioned supplying sources and also to environmental conditions such as emission regulation. Specific examples of gas components which can have bad effects on environment, besides CO, include nitrogen oxides (NO$_x$) and sulfur oxides (SO$_x$).

In cases of the combustion exhaust gases, they may contain volatile organic compounds which are components derived from fuel but have not been burned, and their bad effects on environment are made problems of.

The process for purification of exhaust gases, according to the present invention, can effectively purify also the exhaust gases containing the above nitrogen oxides (NO$_x$) and/or volatile organic compounds in addition to CO, and further can suppress the SO$_2$-oxidizing ratio to low.

There are cases where the exhaust gases which are targeted for purification in the present invention are subjected to various purification of exhaust gases before the process for purification of exhaust gases according to the present invention is carried out or before the purification step is carried out with the catalyst for purification of exhaust gases which is used in the process for purification of exhaust gases according to the present invention. Accordingly, there are cases where components of the exhaust gases in the stage of having been discharged from the aforementioned supplying sources are different from those in the stage of being subjected to purification of exhaust gases by the process for purification of exhaust gases according to the present invention.

The process for purification of exhaust gases, according to the present invention, is effectively applicable also to low-concentration-CO-containing exhaust gases which are difficult to efficiently purify by conventional processes for purification of exhaust gases and with conventional catalysts for purification of exhaust gases. Specifically, the process for purification of exhaust gases, according to the present invention, is effectively applicable even to exhaust gases having a CO concentration of not higher than 100 ppm.

As to the exhaust gases which are targeted for purification in the present invention, there are cases where their temperature conditions or velocity varies with conditions of discharge from the aforementioned supplying sources or with hysteresis of till before the implementation of the purification of exhaust gases.

(Catalyst):

The catalyst for purification of exhaust gases which can be used in the process for purification of exhaust gases according to the present invention (this catalyst may hereinafter be referred to as "catalyst for purification of exhaust gases according to the present invention" or "catalyst according to the present invention") is, as is aforementioned, a honeycomb catalyst having a honeycomb structure such that: the opening size is in the range of 1.0 to 3.0 mm; the opening ratio is in the range of 60 to 80%; and the inner wall thickness is less than 2 mm. If this catalyst is a honeycomb catalyst which can remove CO from the exhaust gases and if this catalyst has the above characteristic structure, there is no especial limitation with regard to such as its materials or other structural characters, and they can fittingly be selected for use. If the catalyst is produced in a manner for the above opening size, opening ratio, and inner wall thickness to come in the above ranges, then it becomes possible to efficiently bring the exhaust gases and the catalyst into contact with each other, so that high purification efficiency can be obtained even if the quantity of the catalytic component is small. In addition, there are obtained great functions and effects such that, even in the case where the exhaust gases contain SO$_2$, it is possible to purify such exhaust gases while efficiently suppressing the SO$_2$-oxidizing ratio to low. Incidentally, the details of the above opening size, opening ratio, and inner wall thickness are specified below.

Particularly favorable of the catalysts for purification of exhaust gases according to the present invention are those which are the above honeycomb catalysts and comprise a support and a catalytic component wherein the catalytic component is supported on the support. Hereinafter, detailed explanations are made about them.

<Support>

The support usable for the catalyst for purification of exhaust gases according to the present invention is a support having a honeycomb structure, that is, a honeycomb support, and surface layers of its inner walls are porous (hereinafter such porous portions may be referred to as "porous structures"). In detail, it is enough for the support to have porous layers in at least surfaces of the above inner walls, and specific examples thereof can include a honeycomb support having porous layers as obtained by a process including the steps of: coating materials (which will form the porous structures) of the support onto surfaces of such as inner walls of a honeycomb-shaped framework base material; and then, for example, calcining them, if necessary. However, a monolithically molded type porous-structural honeycomb support (porous honeycomb support) is also regarded as being included in the aforementioned honeycomb supports usable in the present invention, wherein the porous honeycomb support is obtained by a process including the steps of: extrusion-molding materials (which will form the porous structure) of the support into a honeycomb form with such as an extrusion molding machine; and then calcining the resultant extrusion-molded structure of the honeycomb form. This porous honeycomb support is a monolithically molded structure which is porous, therefore this support does not have such a clearly distinguishable porous layer in surfaces of its inner walls as is possessed by the aforementioned honeycomb support based on the framework base material. However, as to the above porous honeycomb support, naturally because the entirety of its inner walls is porous, surfaces of such inner walls and the neighborhood of those surfaces are also porous, therefore in this respect the porous honeycomb support is regarded as satisfying the requirement "surface layers of its inner walls are porous" as referred to in the present invention.

In the case of the honeycomb support as firstly cited above as a specific example, though not being especially limited, the above honeycomb-shaped framework base material is specifically favorably a heat-resistant base material. Usable examples of the heat-resistant base material include: metals such as stainless steel; ceramics such as cordierite, mullite, and SiC; and ceramic paper obtained by pneumatically molding fibrous ceramics into the form of paper materials.

The honeycomb support is a support having a structure such that a plurality of gas passageways through which the exhaust gases pass are arranged lengthwise and crosswise. As to the above gas passageways, those adjacent to each other are partitioned off from each other by comparatively thin inner walls, and these gas passageways are in the form of what is called honeycomb. Usually, in a section of the support in a direction perpendicular to a direction of a gas flow passing through the gas passageways, the shape of the above inner walls is a lattice. Specifically, it has such a structure as illustrated by FIG. 1.

In addition, as to the shape of the gas passageways in the above section of the support, squares, rectangles, and other various (regular) polygons are adoptable besides (regular) hexagons similar to honeycombs, and further, shapes including curves such as circles, ovals, and ellipses are also adoptable. Incidentally, a wall which forms the whole shape of the catalyst by surrounding all of the above inner walls and the above gas passageways as partitioned off from each other by these inner walls is herein referred to as outer circumferential wall as against the above inner walls.

In the above section of the support, the gas passageways in the honeycomb support may be arranged lengthwise and crosswise in the form of a straight lattice, or can also be arranged in the form of hound's tooth or spirally.

As to the sectional shape of the whole honeycomb support (the whole shape of the above section of the support, that is, the shape surrounded by the above outer circumferential wall), squares, rectangles, and other various (regular) polygons are adoptable, and further, shapes including curves such as circles, ovals, and ellipses are also adoptable.

As to the porous structure as referred to in the present invention, it is enough to be a structure which is of the structure with fine pore spaces and has the property of being able to support the catalytic component, and such as types of its raw material substances are not especially limited. The porous structure can support the catalytic component not only on its outer surfaces but also in the fine pore spaces in its inside, therefore the contact area between the exhaust gases and the catalytic component is so large that the catalytic reaction for purification of exhaust gases can efficiently be carried out. As to the porous structure as referred to in the present invention, porous structures which are conventional and known-in-public as the catalyst support are adoptable.

The porous structure, as referred to in the present invention, favorably includes a metal oxide, and more favorably includes a titanium-containing oxide as an essential component. The titanium-containing oxide referred to herein may be an oxide of Ti (titanium) alone (titanium oxide), or a composite oxide including a combination of Ti and at least one element selected from the group consisting of Si (silicon), Al (aluminum), W (tungsten), and Zr (zirconium). The titanium-containing oxide may be a mixture of this composite oxide (titanium-containing composite oxide) and the titanium oxide. Incidentally, the porous structure may be a mixture of the above titanium-containing oxide with a non-titanium oxide conventionally usable for porous catalyst supports, and examples of this non-titanium oxide include silica, alumina, silica-alumina, zirconia, and zeolite. Hereinafter, the "titanium-containing oxide" is referred to, inclusive also of such a mixed form.

In the above titanium-containing oxide, the Ti content is favorably in the range of 5 to 95 mol %, more favorably 20 to 95 mol %, relative to the total molar number of Ti and the other elements in the whole of the above titanium-containing oxide.

In the case where the porous structure as referred to in the present invention needs to include the titanium-containing oxide, this porous structure not merely has the function of supporting the catalytic component, but also contributes to a function of keeping the supported state of the catalytic component, as supported on the porous structure, suitable for removal of CO, thereby enhancing the exhaust gas purification function of the catalytic component. Specifically, the function of adsorbing and retaining the harmful components such as CO of the exhaust gases inside the porous structure is well displayed and, therefore, not only on surfaces of the porous structure but also inside the porous structure, the supported catalytic component and the titanium-containing oxide synergistically function to effectively enhance the efficiency of the purification of exhaust gases. As a result, high CO-removal performance is obtained without increasing the supported quantity of the catalytic component.

Particularly, the use of the Ti—Si-composite oxide has the advantage of giving what has a low $SO_2$-oxidizing ratio and is excellent in the exhaust gas purifiability.

Incidentally, examples of crystal structures of the titanium-containing oxide include a rutile type and an anatase type, but, of them, the anatase type crystal structure is preferable. The titanium-containing oxide having the anatase type crystal structure would exhibit so high catalytic activity and also have so large a specific surface area as to be able to still more enhance the catalytic activity and the exhaust gas purification efficiency, and further could suppress the $SO_2$-oxidizing ratio to so low as to be able to effectively inhibit the catalyst from being deteriorated by $SO_3$.

In preparation for materials of the porous structure (materials of the support), there can be adopted processes and conditions for preparing conventional known-in-public porous structures. And also in preparation for the metal oxides (e.g. titanium-containing oxides) as materials of the porous structure (materials of the support), there can be adopted processes and conditions for preparing conventional known-in-public metal oxides (e.g. titanium-containing oxides). Above all, examples of preparation of the titanium-containing oxide include techniques as disclosed in such as JP-A-146991/1978. Particularly, a technique as disclosed in the specification of Japanese Patent Application No. 2000-099593 (JP-A-062292/2001) as previously filed by the present applicant can be cited as a favorable technique.

As to raw materials for supplying the materials of the porous structure (materials of the support), there is no especial limitation, and raw material compounds which can produce conventional known-in-public porous structures can be used. In addition, as to raw materials for supplying the metal oxides (e.g. titanium-containing oxides) as materials of the porous structure (materials of the support), beforehand prepared metal oxides (e.g. titanium-containing oxides) can be used as they are, and besides, raw material compounds which can produce the metal oxides (e.g. titanium-containing oxides) by calcination can also be used. Specifically, both inorganic and organic compounds can be used, and usable examples thereof include hydroxides, ammonium salts, ammine complexes, oxalates, halides, sulfates, nitrates, carbonates, and alkoxides, all of which contain predetermined metals such as Ti.

In the case where the aforementioned honeycomb support based on the honeycomb-shaped framework base material is used as the honeycomb support referred to in the present invention, though not being especially limited, specific examples of processes for producing this honeycomb support include: ① a process including the steps of wash-coating the honeycomb-shaped framework base material with an aqueous suspension of support components, and then drying and calcining them, and then supporting the catalytic component; and ② a process including the steps of wash-coating the honeycomb-shaped framework base material with an aqueous suspension of support components on which the catalytic component has beforehand been supported, and then drying and calcining them.

The honeycomb support, as referred to in the present invention, favorably has the porous surface layers both in its inner wall and in outer circumferential wall. In addition, in the honeycomb support as referred to in the present invention, the porous surface layer content (weight %) of its inner walls and outer circumferential wall is not especially limited, but it is enough to have the porous surface layers satisfying the below-mentioned thickness range in inner walls of the honeycomb support.

The honeycomb support, as used for the catalyst for purification of exhaust gases according to the present invention, is preferably a monolithically molded type porous honeycomb support of the aforementioned various honeycomb supports in respect of providing still higher exhaust gas purification efficiency. Hereinafter, explanations are made about this monolithically molded type porous honeycomb support.

As is mentioned above, the porous honeycomb support is a porous-structural monolithically molded type honeycomb support and is a support of a honeycomb type having fine pore spaces inside. The porous honeycomb support can support the catalytic component on its outer surfaces and in the fine pore spaces in its inside (i.e. the whole of the support), and as a result, the contact area between the exhaust gases and the catalytic component is so much large that the purification reaction can efficiently be carried out.

The porous honeycomb support can be produced by a process including the steps of: extrusion-molding the materials of the support (materials of the porous structure) to obtain an extrusion-molded structure of the honeycomb form; and then calcining this molded structure. Applicable to the above production process are the same production conditions as those for conventional known-in-public porous honeycomb supports.

The materials of the support (materials of the porous structure) are extrusion-molded either in a state left as they are powdery, or in the form of such as a powder-dispersed slurry, with such as conventional known-in-public extrusion molding apparatuses. Setting of the die shape of the extrusion molding apparatuses can give the honeycomb form and also can adjust the shape and measurements and the inner wall thickness of the aimed gas passageways.

The molded product from the extrusion-molding is cut every predetermined length, thus obtaining the extrusion-molded structure. A change of the cutting interval can adjust the length (length in a gas flow direction) of the porous honeycomb support.

The extrusion-molded structure is dried and/or aged, if necessary, and then calcined with such as calcination furnaces, thus obtaining the honeycomb support. To the treatment conditions such as calcination temperature and calcination time, there can be applied the same range as that for production of conventional porous honeycomb supports.

The honeycomb support obtained in this way is a porous support.

The porous honeycomb support is more excellent in respect to the catalyst-supporting function and the catalytic activity than a sintered honeycomb support (including such as cordierite) conventionally known as a catalyst support. The sintered honeycomb support is a sintered structure as sintered usually in the range of about 1,200 to about 1,450° C., and is in the form of so well-sintered-and-set porcelain as to have an extremely small specific surface area, which is merely 0.3 $m^2/g$ at most. However, the porous honeycomb support is a product obtained by calcination at a comparatively low calcination temperature, specifically, in the range of 200 to 600° C., and has a porous structure of a large specific surface area of more than 10 $m^2/g$ throughout the entirety of from surface to inside of the support. As a result, the porous honeycomb support can support the catalytic component much inside the porous structure, so it becomes possible to obtain a honeycomb-shaped catalyst having high catalytic activity. As to the conventional sintered honeycomb support, the porous structure is absent, or slightly present even if any, inside the support, so the catalytic component cannot be supported much inside the support, and the catalytic activity cannot be displayed enough.

In addition, the porous honeycomb support is a monolithically molded type honeycomb support and is therefore very excellent in the exhaust gas purification efficiency. Specifically, the porous honeycomb support is not a honeycomb support obtained by using the aforementioned framework base material made of metals and/or cordierite besides materials of the support (materials of the porous structure), but is basically a honeycomb support obtained by a process involving molding the materials themselves of the support (materials themselves of the porous structure) into a honeycomb form, so the exhaust gases being purified can pass not only through the finely partitioned gas passageways from the gas inlet side to the gas outlet side but also through the inner walls which partition the gas passageways off from each other. As to the honeycomb support obtained by using the above framework base material, the exhaust gases do not pass through the inner walls in this way, whereas, as to the monolithically molded type honeycomb support, the purification efficiency can be more enhanced correspondingly to the passage of the exhaust gases through the inner walls.

Similarly to the catalyst for purification of exhaust gases according to the present invention, the honeycomb support as referred to in the present invention has, for example, a honeycomb structure as shown in FIG. 1. Hereinafter, with respect to the above honeycomb support, detailed explanations are made about its inner wall thickness, porous surface layer thickness, length in a-gas flow direction, opening size (one-edge length of gas passageways), opening ratio, compression fracture strength, total pore volume, and specific surface area.

The honeycomb support as referred to in the present invention is such that surface layers of at least 0.01 mm of its inner walls are porous (that is, a honeycomb support such that its inner walls have their respective porous surface layers of at least 0.01 mm in thickness), and this thickness of each porous surface layer is more favorably at least 0.02 mm, still more favorably at least 0.03 mm. In the case where the thickness of each porous surface layer is less than 0.01 mm, it may be impossible to sufficiently support the catalytic component, so the catalytic activity may be low. Incidentally, the above porous surface layer may exist in both-side surfaces of each inner wall, or in only a one-side surface of each inner wall, but favorably exists in both-side surfaces. In addition, in the case where the above porous surface layer exists in only a one-side surface of each inner wall, it is enough that this existing porous surface layer satisfies the above range, and even in the case where the above porous surface layer exists in both-side surfaces of each inner wall, it is enough that a porous surface layer satisfying the above range exists in at least a one-side surface, but it is favorable that such a porous surface layer as satisfies the above range exists in both-side surfaces.

As to the honeycomb support as referred to in the present invention, its inner wall thickness (thickness of a whole section of each inner wall) is favorably less than 2 mm, more favorably in the range of 0.03 to 1 mm, still more favorably 0.05 to 0.8 mm, particularly favorably 0.1 to 0.6 mm. Furthermore, in the case where the honeycomb support as referred to in the present invention is the aforementioned monolithically molded type porous honeycomb support, its inner wall thickness (thickness of a whole section of each inner wall) is favorably in the range of 0.1 to 0.5 mm, more favorably 0.2 to 0.4 mm. In the case where the above inner wall thickness is too thin, the mechanical strength is so low that the handling is difficult in such as operations of equipping the catalyst to apparatuses for purification of exhaust gases and to catalyst receptacles. In the case where the inner wall thickness is too thick, the reaction efficiency is low, and further the pressure drop is much. When the inner wall thickness is thick, the $SO_2$-oxidizing ratio is so high that the aforementioned unfavorable effects of $SO_3$ are remarkable.

In the present invention, it doesn't matter whether the above porous surface layer thickness and/or the above inner wall thickness is the same throughout the whole of the honeycomb support or not. Whichever case will do if it satisfies the above range.

As to the honeycomb support as referred to in the present invention, its length in a gas flow direction is in the range of 25 to 300 mm, favorably 35 to 250 mm, more favorably 50 to 200 mm. Furthermore, in the case where the honeycomb support as referred to in the present invention is the aforementioned monolithically molded type porous honeycomb support, its length in a gas flow direction is favorably in the range of 50 to 200 mm, more favorably 60 to 180 mm. In the case where the above length in a gas flow direction is too short, the strength is so weak that the handling is difficult. In the case where this length is too long, the pressure drop is much.

As to the honeycomb support as referred to in the present invention, its opening size (one-edge length of the gas passageways) in a section perpendicular to a gas flow direction is favorably in the range of 1.0 to 3.0 mm, more favorably 1.5 to 2.5 mm. The "one-edge length of the gas passageways", as herein referred to, means a one-edge length of a square in the case where the shape of the gas passageways in the above section is the square, but, as to the honeycomb support as referred to in the present invention, the shape of the gas passageways is not especially limited to the square. For example adoptable are various other patterns such as rectangles, parallelograms, various (regular) polygons, and curved shapes (e.g. circles, ovals, and ellipses). Therefore, in the case where the shape of the gas passageways in the above section is among these other patterns, for example, if the shape is the rectangle, then it is favorable that both lengths of its long and short sides are adjusted so as to come in the above range. In cases of the other shapes, it is favorable that their diameters are adjusted so as to come in the above range. In the case where the above one-edge length of the gas passageways is too narrow, the pressure drop is excessively much. In the case where this length is too wide, the purification efficiency is low, or the strength is insufficient.

As to the honeycomb support as referred to in the present invention, its opening ratio (ratio of sectional area of the gas passageways to area of the whole of the following section) in a section perpendicular to a gas flow direction is favorably in the range of 60 to 80%, more favorably 65 to 75%. In the case where the opening ratio is too small, the pressure drop is excessively much. In the case where the opening ratio is too large, the strength is weak.

As to the honeycomb support as referred to in the present invention, its compression fracture strength is favorably not less than 0.3 MPa, more favorably not less than 0.4 MPa, still more favorably not less than 0.6 MPa. In the case where the compression fracture strength is low, the handling is difficult. In the case where the compression fracture strength is high, the production is difficult.

Figure 2:
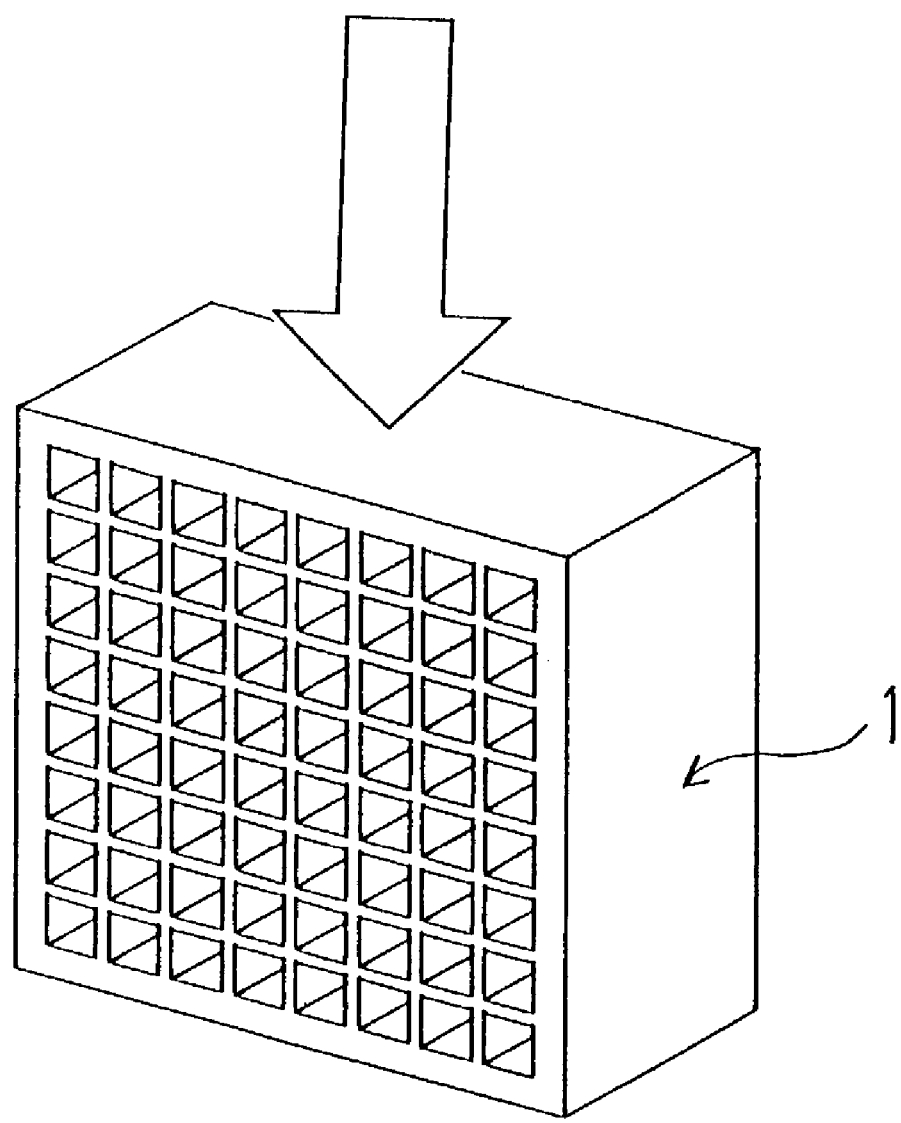
FIG. 2 is an image view showing a load as applied to the catalyst for purification of exhaust gases from a direction perpendicular to a gas flow direction.

Giving explanations more specifically about the above compression fracture strength, as is shown by the arrow in FIG. 2, the compression fracture strength against a load from a direction perpendicular to a gas flow direction (compression fracture strength in a direction perpendicular to a gas flow direction) is favorably not less than 0.3 MPa, more favorably not less than 0.5 MPa, still more favorably not less than 0.7 MPa. In addition, as is shown by the arrow in FIG. 3, the compression fracture strength against a load from a gas flow direction (compression fracture strength in a gas flow direction) is favorably not less than 1.0 MPa, more favorably not less than 2.0 MPa, still more favorably not less than 3.0 MPa.

(Total Pore Volume and Average Pore Diameter):

The honeycomb support, as referred to in the present invention, is a support having porous surface layers containing fine pores. Such as quantity and size of the pores have influences on such as: flowing-through of exhaust gases; supporting of the catalytic component particles; diffusion of exhaust gases inside the support; catalytic activity; exhaust gas purification efficiency; and mechanical strength.

As to the honeycomb support as referred to in the present invention, its total pore volume is favorably in the range of 0.20 to 0.80 cm$^3$/g, more favorably 0.25 to 0.75 cm$^3$/g, still more favorably 0.30 to 0.60 cm$^3$/g. In the case where the above total pore volume is too small, there is a possibility that: the diffusion of exhaust gases inside the catalyst may not be promoted, and it may therefore be difficult to enhance the exhaust gas purification efficiency. In the case where the above total pore volume is too large, there is a possibility that: the above effect of enhancing the exhaust gas purification efficiency to such a degree as rewards this increase may not be obtained, and further, the mechanical strength of the catalyst may be rather low. As to the honeycomb support as referred to in the present invention, for the same reason as of the above total pore volume, it is favorable to arrange for its average pore diameter to also satisfy the following range. That is to say, the average pore diameter of the honeycomb support is favorably in the range of 0.010 to 0.50 μm, more favorably 0.010 to 0.030 μm, still more favorably 0.015 to 0.10 μm. In the case where the above average pore diameter is smaller than 0.010 μm, there is a possibility that: the diffusion of exhaust gases inside the catalyst may not be promoted, and it may therefore be difficult to enhance the exhaust gas purification efficiency. In the case where the above average pore diameter is larger than 0.50 μm, there is a possibility that: the exhaust gas purification efficiency of such a degree as rewards this increase may not be obtained, and further, the mechanical strength of the catalyst may be rather low.

Incidentally, the above values of the total pore volume and average pore diameter of the honeycomb support are values as measured by the mercury penetration method.

Because the honeycomb support, as referred to in the present invention, is a support having porous surface layers containing fine pores, its specific surface area also has influences on such as performance of the resultant catalyst. For efficient oxidation removal of CO (particularly, CO as contained in only a slight quantity in exhaust gases) on the catalyst, it is necessary to carry out the contact between the catalytic component (as supported on the support) and CO. It is favorable therefor to support the catalytic component to a still higher degree of dispersion to thus increase the exposed surfaces of the catalytic component, thereby increasing the contact area between the catalytic component and CO. From this viewpoint, the larger the specific surface area of the honeycomb support is, the more favorable it is. Specifically, this specific surface area is favorably not less than 20 $m^2/g$, more favorably not less than 30 $m^2/g$, still more favorably not less than 40 $m^2/g$. In the case where the above specific surface area is less than 20 $m^2/g$, there is a possibility that: the catalytic component cannot be supported to such a degree that it is well dispersed, therefore the efficiency of the contact between the catalytic component and CO and the catalytic activity may be so low that it may be impossible to obtain sufficient exhaust gas purification efficiency. On the other hand, even if the specific surface area is made excessively large, there is a possibility that: the efficiency of the contact between the catalytic component and CO or the catalytic activity cannot be enhanced by such a degree as rewards this increase of the specific surface area, but rather there may occur unfavorable effects such that: the accumulation of catalytically poisonous components increases, or the life time of the catalyst becomes short. From these viewpoints, though not especially being limited, the upper limit of the specific surface area of the honeycomb support is favorably 300 $m^2/g$, more favorably 250 $m^2/g$, still more favorably 200 $m^2/g$.

Incidentally, the above values of the specific surface area are values as measured by the BET method (BET single-point method).

The thickness of the outer circumferential wall of the honeycomb support as referred to in the present invention is not limited by the inner wall thickness conditions. In consideration of such as total strength and handling property, the thickness of the outer circumferential wall can be set at a sufficient thickness (for example, in the range of 1 to 5 mm) that is thicker than the inner wall thickness. In addition, though not especially being limited, the number of the gas passageways as can be opened through the honeycomb support is for example favorably in the range of 1,800 to 18,000, more favorably 2,000 to 16,000, per area of 150 mm×150 mm. of a section, perpendicular to a gas flow direction, of the support.

<Catalytic Components and Supporting Thereof>
(Catalytic Component A):

As to the catalyst for purification of exhaust gases according to the present invention, as the catalytic component A there can be used a catalytic component including a noble metal element. As the noble metal element, for specific example, there is used at least one member selected from the group consisting of Pt, Pd, Rh, Ru, Ir, and Au. The catalytic component A may be a metal including the above noble metal element, or such as a compound (e.g. oxide) thereof.

Usable as raw materials for supplying the catalytic component A are materials utilized for such as production of conventional catalysts. Specific examples thereof include nitrates, halides, ammonium salts, ammine complexes, and hydroxides.

As to means for supporting the catalytic component A on the support, basically, there can be adopted those which are common to conventional metal-oxide-supported noble metal catalysts.

In the case where the catalyst and the exhaust gases are brought into contact with each other at a high space velocity (SV) to remove the CO from the exhaust gases, most of the purification reaction by the catalyst can be considered to occur in surface layer portions of the catalyst. In such a case, the efficiency of the purification of the exhaust gases with the catalyst can be enhanced by supporting the catalytic component A in the form distributed with a quantitatively great inclination toward the catalyst surface layer portions with which the exhaust gases come into contact.

The quantity of the supported catalytic component A differs according to such as combinations of materials or treatment conditions of supporting treatment, but usually the catalytic component A is used in the range of 0.005 to 2.0 weight %, favorably 0.01 to 1.0 weight %, of the entirety of the catalyst. The reason therefor is as follows. In the case where the quantity of the supported catalytic component A is too small, the catalytic activity is low. Also in the case where the quantity of the supported catalytic component A is too large, the effect is hopeless of enhancement of the activity, and the economical performance is merely damaged, and further, there occur unfavorable effects such that the conversion of $SO_2 \rightarrow SO_3$ is high.

The catalytic component A is usually supported in the form of particles on the support. As to particle diameters of the catalytic component A, those which have an average particle diameter of not larger than 30 nm are favorable. More favorably, the average particle diameter is not larger than 20 nm. The smaller the particle diameters of the catalytic component A are and the higher the degree of the dispersed state of the catalytic component A is, the higher the activity becomes.

Incidentally, in the present invention, it is prescribed that the catalytic component A should be supported in porous portions of the honeycomb support, but the catalytic component A is not limited to being entirely supported in such a way. and, according to circumstances, a part of the catalytic component A is permitted to, for example, be supported in nonporous portions. Hereinafter, the same prescription and permission as the above are applied also to supporting or containing of other catalytic components and other components.

(Catalytic Component B):

As to the catalyst for purification of exhaust gases according to the present invention, as the catalytic component B there can further be used a catalytic component including at least one element as included in groups 1 to 3 in a periodic table. Specific examples of the element as included in groups 1 to 3 in a periodic table include Na, Li, Mg, Ca, Y, Ce, and La. The catalytic component B may be a metal including the above element as included in groups 1 to 3 in a periodic table, or such as a compound (e.g. oxide) thereof.

If the catalyst further comprising the catalytic component B as another catalytic component is used, then the purifiability becomes better than in the case of supporting the catalytic component A alone, so the quantity of the catalytic component A as used can effectively be decreased. In addition, at the same time, the coexistence of the catalytic component B in the catalyst suppresses the oxidation of $SO_2$, and also enhances the resistance to the $SO_x$ and the heat resistance, so that it is possible to maintain the purification efficiency stably for a long term even if the quantity of the supported catalytic component A is small.

Raw materials for supplying the catalytic component B are not especially limited, and at least one material as utilized for such as production of conventional catalysts is usable, but favorable examples thereof include those which contain organic components (e.g. organic acids) in their molecules, such as organic acid salts, alkoxides, and organometallic complexes.

The process for supporting the catalytic component B is not especially limited, either, and the catalytic component B can be supported by processes as utilized for production of conventional catalysts.

The quantity of the supported catalytic component B is favorably in the range of not larger than 20 weight %, more favorably 0.01 to 20 weight %, still more favorably 0.1 to 10 weight %, of the entirety of the catalyst. In the case where the quantity of the supported catalytic component B is too small, the above effect peculiar to the catalytic component B is not obtained. Even if the quantity of the supported catalytic component B is increased to larger than the above ranges, the effect is hopeless of enhancement of the activity, and the activity may inversely be deteriorated.

There is no especial limitation with regard to the supporting order, either. The catalytic component B may be supported any time of following, preceding, and simultaneously with the catalytic component A. Above all, it is favorable to support the catalytic component B following or simultaneously with the catalytic component A.

(Supporting of Catalytic Components A and B):

In the catalyst for purification of exhaust gases according to the present invention, there can be supported both the above catalytic components A and B. However, in the treatment step of supporting these catalytic components A and B on the support, such as means and conditions for supporting each catalytic component may be selected in a manner either to distribute each catalytic component with as quantitatively great an inclination toward surfaces of the resultant catalyst as possible, or to make each catalytic component exist quantitatively substantially evenly throughout the whole of the resultant catalyst, therefore they are not especially limited. Usually, the catalytic reactions of the catalytic components A and B can be considered to occur in surface layer portions, which are to be portions coming into contact with exhaust gases, of the catalyst. Therefore, if the catalytic component is distributed with as quantitatively great an inclination toward surfaces of the catalyst as possible, even if the quantity of the supported catalytic component A or B is the same, then the efficiency of the purification of the exhaust gases with the catalyst becomes so high that the quantity of the supported catalytic component A or B can be saved with such a high efficiency kept. Accordingly, the cost can be saved, and the $SO_2$-oxidizing ratio becomes low. On the other hand, as to the catalytic reactions of the catalytic components A and B, it is favorable that stable purification efficiency is maintained for a long term. However, when the catalyst is used for a long term, there are, according to purification conditions, cases where surfaces abrade to gradually deteriorate the purification efficiency. Hereupon, if the catalytic component A or B is made to exist quantitatively substantially evenly throughout the whole of the catalyst, even if the quantity of the supported catalytic component A or B is the same, then stable purification efficiency can be maintained for a long term even when the catalyst abrades. Accordingly, in long-term aspects, the cost can be saved, and a state where the $SO_2$-oxidizing ratio is low can be maintained for a long term.

Hereupon, for the catalytic component to be distributed with a quantitatively great inclination toward surfaces of the catalyst (distribution inclined quantitatively greatly toward surfaces), it is enough that, in the catalyst resultant from supporting of the catalytic component in surfaces of the support and/or in the neighborhood of those surfaces, the catalytic component is present in surface layers of this catalyst or present in the neighborhood of surfaces of this catalyst with the distribution range being wide to some degree in a direction deeper than the above surface layers, so there is no especial limitation. For specific example, in a drawing figure (graph) showing the relation between the sectional thickness direction of the inner wall portions of the honeycomb-shaped catalyst and the X-ray intensity I characteristic of the catalytic component A or B as obtained by continuously measuring (carrying out linear analysis measurement of) an inner wall portion of the honeycomb-shaped catalyst as to the designated catalytic component in a direction from an outer surface of the inner wall portion toward its opposite outer surface with an electron probe microanalyzer (EPMA), when the integrated value of the X-ray intensity I throughout the whole of the sectional thickness T of the aforementioned inner wall portions is represented by $N_0$ and when the integrated value of the X-ray intensity I of from outer surfaces of the inner wall portions to portions of the depth of T/4 in a direction toward the inside of the inner wall portions is represented by N, then $70 \leq N/N_0 \times 100$) is favorable, and $80 \leq (N/N_0 \times 100)$ is more favorable, and $90 \leq (N/N_0 \times 100)$ is still more favorable, and $95 \leq (N/N_0 \times 100)$ is particularly favorable.

More specifically, for example, favorably not less than 70 weight % (more favorably not less than 80 weight %, still more favorably not less than 90 weight %, particularly favorably not less than 95 weight %) of the total quantity of the catalytic component, as supported on the honeycomb support, is distributed with a quantitatively great inclination toward the range of from outer surfaces to a depth of 100 μm in the catalyst. Defining the quantity of the existence in the range of from outer surfaces to a depth of 100 μm in the catalyst in this way is favorable for the case where the inner wall thickness of the honeycomb-shaped catalyst is not less than 0.3 mm, more favorably in the range of 0.3 to 1.0 mm, still more favorably in the range of 0.3 to 0.6 mm.

On the other hand, that the catalytic component is present quantitatively substantially evenly throughout the whole catalyst is not limited to that the catalytic component is present in a quantitatively completely evenly distributed state throughout the whole catalyst, but, for example, the catalytic component may be distributed in the range of the neighborhood of surfaces more than average, or otherwise the catalytic component may be distributed inside the catalyst more than in its surfaces. In short, a form of the presence other than the above distribution inclined quantitatively greatly toward surfaces is enough. Specifically making mention with the above definition for $N_0$ and N, this other form of the presence is shown by $(N/N_0 \times 100) < 70$ and, favorably for being said to be quantitatively evener, $(N/N_0 \times 100) < 65$, more favorably $(N/N_0 \times 100) < 60$. specifically making mention in the same way as of the case of the distribution inclined quantitatively greatly toward surfaces, the ratio of the catalytic component existing in the range of from outer surfaces to a depth of 100 μm in the catalyst relative to the total quantity of the catalytic component, as supported on the honeycomb support, is less than 70 weight % and, favorably for being said to be quantitatively evener, less than 65 weight %, more favorably less than 60 weight %.

Incidentally, in the case where the catalyst for purification of exhaust gases according to the present invention is in the form such that a porous layer is coated on a surface of a framework base material made of such as metals and/or cordierite, the above "sectional thickness T of the inner wall portions" is defined as the thickness of only the porous surface layer as left by subtracting the thickness of the framework base material from the total sectional thickness including the thickness of the framework base material, and is treated as favorably satisfying the above conditions of the linear analysis measurement in the range of "from outer surfaces of the inner wall portions to portions of the depth of T/4 in a direction toward the inside of the inner wall portions". However, in the case where the thickness of one of the porous surface layers of the inner wall portion is less than T/4 (also including zero), regardless of this surface layer having the thickness of less than T/4, only the other surface layer is treated as favorably satisfying the above conditions of the linear analysis measurement in the range of "from outer surfaces of the inner wall portions to portions of the depth of T/2 in a direction toward the inside of the inner wall portions".

As to the case 1) where the catalytic components A and B are both distributed with a quantitatively great inclination toward surfaces of the catalyst, there are the following functions and effects. That is to say, the CO-removing reaction occurs mainly in surfaces of the catalyst. Therefore, if arrangements are made in such a manner that the catalytic component A (which is a noble metal) and the catalytic component B (which is an element as included in groups I to III in a periodic table) can be both distributed with a quantitatively great inclination toward surfaces, even if the supporting quantity is the same, then the reaction efficiency can greatly be enhanced, and the economical performance is also excellent. In addition, the catalytic component B can enhance the CO-removing activity of the catalytic component A by what is called promoter effect.

As to the case 2) where the catalytic component A is distributed with a quantitatively great inclination toward surfaces of the catalyst, whereas the catalytic component B is present quantitatively substantially evenly throughout the whole catalyst, then there are the following functions and effects. That is to say, the achievement of high CO-removing activity usually requires the catalyst to have high oxidation activity, but demanded is selectivity such that the $SO_2$-oxidation ($SO_2 \rightarrow SO_3$) activity is desired to be suppressed to as low as possible. In addition, the element as included in groups I to III in a periodic table can effectively scavenge $SO_x$, and is therefore considered to consequently be also able to suppress the $SO_2$-oxidation activity. The CO-removing reaction occurs mainly in surfaces of the catalyst, and the oxidation reaction of $SO_2$ can occur also inside the catalyst. Therefore, if the catalytic component A (which is a noble metal) is caused to be distributed with a quantitatively great inclination toward surfaces, whereas the catalytic component B (which is an element as included in groups I to III in a periodic table) is caused to exist quantitatively substantially evenly throughout the whole catalyst, then the above selectivity as demanded to the catalyst can efficiently be enhanced.

As to the case 3) where the catalytic components A and B are both present quantitatively substantially evenly throughout the whole catalyst, there are the following functions and effects. That is to say, catalytically poisonous substances to the catalyst usually accumulates mostly on surfaces of the catalyst, and such as abrasion of the catalyst also goes on from the surfaces of the catalyst. Therefore, if the catalytic component A (which is a noble metal) and the catalytic component B (which is an element as included in groups I to III in a periodic table) are both caused to exist quantitatively substantially evenly throughout the whole catalyst, then high catalytic activity and purification efficiency can be maintained stably for a long term. In addition, the catalytic component B can enhance the CO-removing activity of the catalytic component A by what is called promoter effect.

As to the case 4) where the catalytic component A is present quantitatively substantially evenly throughout the whole catalyst, whereas the catalytic component B is distributed with a quantitatively great inclination toward surfaces of the catalyst, then there are the following functions and effects. That is to say, usually, $SO_x$ (particularly, $SO_3$) as contained in exhaust gases has a great influence on the catalytic activity even if its quantity is extremely small. Therefore, it can be considered that the enablement of scavenging of various $SO_x$ near surfaces of the catalyst as much as possible leads to the enhancement of the $SO_x$ resistance throughout the whole catalyst, that is, the prevention of the catalytic activity from being deteriorated by $SO_x$ (particularly, $SO_3$ ($SO_3$ is formed by oxidation of $SO_2$: the catalytic component A has such oxidation activity)). The element as included in groups I to III in a periodic table can effectively scavenge $SO_x$. In addition, usually, the diffusion of exhaust gases goes on from surfaces of the catalyst to its inside. Therefore, if the catalytic component B (which is an element as included in groups I to III in a periodic table) is caused to be distributed with a quantitatively great inclination toward surfaces, whereas the catalytic component A (which is a noble metal) is caused to exist quantitatively substantially evenly throughout the whole catalyst, then CO can be removed inside the catalyst while the above $SO_2$-oxidation ($SO_2 \rightarrow SO_3$) activity due to the catalytic component A in the neighborhood of surfaces of the catalyst is decreased and further while various $SO_x$ are scavenged in the neighborhood of surfaces of the catalyst as much as possible. Thus, the above $SO_x$ resistance can be enhanced. Incidentally, the supported states of the catalytic components A and B in 1) to 4) above can be selected fittingly for such as: behavior and states of low-concentration-CO-containing exhaust gases which are targeted for purification; purification conditions; and demanded purification efficiency.

As to treatment processes for supporting the catalytic components A and/or B on the support, although there is no especial limitation, for example, a supporting technique by impregnation (impregnation of a solution or mixed solution (impregnation solution) containing the raw materials for supplying the catalytic components (hereinafter such raw materials are also referred to simply as catalytic components)) is favorably applicable thereto. In the case where the catalytic component is supported by the impregnation, the catalytic component is, for example, supported by chemical or physical adsorption. However, whether the supporting of the catalytic component is carried out by chemical adsorption or by physical adsorption is determined by how the kinds of the support and of the catalytic component being adsorbed are selected and combined, for specific example, as follows: in the case where the support is a titanium-containing oxide including such as oxides of silicon, aluminum, tungsten, and zirconium and where the catalytic component is hexaammineplatinum hydroxide, the treatment is carried out mainly by chemical adsorption; and in the case where the support is a titanium-containing oxide including such as oxides of silicon, aluminum, tungsten, and zirconium and where the catalytic component is an acetate of an element as included in groups I to III in a periodic table, the treatment is carried out mainly by physical adsorption.

Generally, in the case of the chemical adsorption, the support and the catalytic component can strongly be bonded to each other, so, once the adsorption is achieved, the migration of the catalytic component from the support is difficult to occur. Accordingly, in the case where the support is impregnated with the impregnation solution containing the catalytic component (for example, in the case where the support is impregnated with such as an aqueous solution in which the catalytic component is dissolved), the adsorption usually runs precedently from surfaces of the catalyst either with the progress of the absorption of the impregnation solution or by attainment of the catalytic component (as diffused in the impregnation solution (also including that before being adsorbed by the support)) to absorption sites of the support, so that the migration of the catalytic component is difficult to cause by subsequent drying. Thus, in the case where the catalytic component is caused to be distributed with a quantitatively great inclination toward surfaces, it is, for example, enough to shorten the impregnation time, whereas, in the case where the catalytic component is caused to exist quantitatively substantially evenly throughout the whole catalyst, it is, for example, enough to lengthen the impregnation time. That is to say, as to the supporting of the catalytic component by the chemical adsorption, it can be considered that the supported state of such as whether the catalytic component is caused to be distributed with a quantitatively great inclination toward surfaces or to exist quantitatively substantially evenly is influenced to some degree also by drying conditions, but more by impregnation conditions such as the impregnation time. Incidentally, the impregnation time is defined as a time of from the initiation of the impregnation of the support with the impregnation solution, containing the catalytic component, till the end of the impregnation (separation of the support from the impregnation solution) (hereinafter the same). In addition, in the treatment of supporting the catalytic component by the chemical adsorption, usually, the support is impregnated with an impregnation solution containing the catalytic component in a heated state. By this impregnation in such a heated state, the chemical adsorption is efficiently done to facilitate the supporting. Specifically, it is favorable to heat the temperature of the impregnation solution containing the catalytic component to not lower than 40° C., more favorably not lower than 50° C., or not lower than 60° C., or not lower than 70° C., or not lower than 80° C., or not lower than 90° C. In the case where the temperature of the impregnation solution is too low, it may be impossible to support a desired quantity of catalytic component.

Generally, in the case of the physical adsorption, the bonding between the support and the catalytic component is weaker than in the case of the chemical adsorption. Accordingly, in the case where the support is impregnated with the impregnation solution containing the catalytic component (for example, in the case where the support is impregnated with such as an aqueous solution in which the catalytic component is dissolved), the catalytic component can be caused to exist throughout the whole catalyst with the progress of the absorption of the impregnation solution, but the catalytic component also easily migrates along with migration of such as water by drying in the subsequent drying step. Thus, in the case where the catalytic component is caused to be distributed with a quantitatively great inclination toward surfaces, it is favorable to moderately shorten the impregnation time and further, if possible, to cause the catalytic component to migrate toward surfaces of the catalyst along with water by quick drying after the impregnation. On the other hand, in the case where the catalytic component is caused to exist quantitatively substantially evenly throughout the whole catalyst, it is favorable to moderately lengthen the impregnation time and further to inhibit the migration of the catalytic component by moderating the migration of water by slow drying after the impregnation. That is to say, as to the supporting of the catalytic component by the physical adsorption, it can be considered that the supported state of such as whether the catalytic component is caused to be distributed with a quantitatively great inclination toward surfaces, or to exist quantitatively substantially evenly, depends on the balance between impregnation conditions (e.g. impregnation time) and drying conditions, but is usually influenced more by drying conditions.

With regard to treatment processes for supporting the catalytic component on the support, particularly in the case where the catalytic component is desired to exist quantitatively substantially evenly throughout the whole catalyst, besides the above treatment processes for supporting by impregnation, for example, there can be cited the following processes: ① a process including the step of mixing a powder or slurry of a component of the support (or a compound to form the component of the support by calcination) with a powder of the catalytic component, a solution containing the catalytic component, or a mixed solution containing the catalytic components; and ② a process including the steps of mixing together a solution of a component of the support (or a compound to form the component of the support by calcination) and a solution containing the catalytic component, and then forming a coprecipitate. By these processes, the catalytic component can be caused to quantitatively almost substantially evenly be supported even if such as drying conditions which are considerable conditions as to the above treatment processes for supporting by impregnation are not controlled or regulated. Specifically, for example, in the case where the catalytic component B is caused to quantitatively substantially evenly be supported and where the catalytic component A is caused to be distributed with a quantitatively great inclination toward surfaces, it is enough that: a powder or slurry containing a component of the support (or a compound to form the component of the support by calcination) and the catalytic component B is prepared and molded, and then dried and calcined, and then on surfaces of the calcined product there is supported the catalytic component A by such as the above treatment processes for supporting by impregnation.

(Catalytic Component C):

The catalyst for purification of exhaust gases, according to the present invention, can be caused to further contain a catalytic component including at least one element selected from the group consisting of V, W, Mo, Cu, Mn, Ni, Co, Cr, and Fe as the catalytic component C. The catalytic component C may be a metal including the above various elements, or such as a compound (e.g. oxide) thereof. It is favorable to make the catalytic component C contained in the range of not more than 10 weight %, more favorably 0.01 to 10 weight %, in terms of atom of the above various elements (V, W, Mo, Cu, Mn, Ni, Co, Cr, and Fe) relative to the entity of the catalyst. The addition of the catalytic component C can more enhance the efficiency of the purification of the low-concentration-CO-containing exhaust gases, or give the nitrogen oxides ($NO_x$) removal function.

Raw materials for supplying the catalytic component C are not especially limited, and at least one material as utilized for production of conventional catalysts is usable. There is no especial limitation with regard to the supporting process, either, and the catalytic component C can be supported on the support by processes as utilized for production of conventional catalysts, for example, processes as aforementioned about the catalytic components A and B. There is no especial limitation with regard to the supporting order, either. Specifically, it is permissible that, on the support, there are simultaneously supported the catalytic components A and C, or there is supported the catalytic component C following the catalytic component A, or there is supported the catalytic component A following the catalytic component C. Also in the case of a catalyst containing the catalytic component B besides the catalytic component A, it is permissible that, on the support, there is supported the catalytic component C simultaneously with the catalytic components A and B, or there is supported the catalytic component C following the catalytic components A and B, or there are supported the catalytic components A and B following the catalytic component C. Incidentally, similarly to the catalytic component B, the catalytic component C may be caused to be distributed with a quantitatively great inclination toward surfaces of the catalyst or may be caused to exist quantitatively substantially evenly throughout the whole catalyst without such a quantitatively great inclination.

<Other Components and Their Being Contained>

The catalyst for purification of exhaust gases, according to the present invention, can be caused to further contain "a compound of at least one element selected from the group consisting of B, P, Sb, Pb, Sn, Zn, and In (hereinafter referred to as compound D')" and/or "glass fibers, whiskers, and/or silica particles" as another component D.

(Compound D'):

The addition of the compound D' as another component D to the catalyst according to the present invention enables this catalyst to remove CO from exhaust gases with high efficiency for a long term while keeping the oxidation of $SO_2$ low.

Raw materials for supplying the compound D' are not especially limited, and at least one material as utilized for production of conventional catalysts is usable. There is no especial limitation with regard to processes for making the compound D' contained, either, and examples thereof include: a process involving making the compound D' contained by supporting it on the support by processes as utilized for production of conventional catalysts; and a process involving making the compound D' contained either by adding and mixing it in preparing the support or by using the compound D' as one of materials of the support. Above all, in the case of making the compound D' contained by the supporting, although there is no especial limitation with regard to the supporting order, either, specifically, it is favorable that, on the support, there are simultaneously supported the catalytic component A and the compound D', or there is supported the compound D' preceding the catalytic component A. Also in the case of a catalyst containing the catalytic component B besides the catalytic component A, it is favorable that, on the support, there is supported the compound D' simultaneously with the catalytic components A and B, or there is supported the compound D' preceding the catalytic components A and B. Incidentally, similarly to the catalytic component B, the compound D' may be caused to be distributed with a quantitatively great inclination toward surfaces of the catalyst or may be caused to exist quantitatively substantially evenly throughout the whole catalyst without such a quantitatively great inclination. In addition, in the case of supporting both the above catalytic component C and the compound D', the supporting order therebetween is not especially limited, and they may simultaneously be supported, or either one may be supported preceding the other.

It is favorable to make the compound D' contained in the range of not more than 10 weight %, more favorably 0.005 to 10 weight %, still more favorably 0.02 to 5 weight %, in terms of atom of the above various elements (B, P, Sb, Pb, Sn, Zn, and In) relative to the entity of the catalyst. In the case where the compound D' content is higher than 10 weight %, there is a possibility that the compound D' may act as a poisonous component to the active component and thereby inversely deteriorate the activity.

As the compound D', for example, phosphorus compounds are favorably usable, and explanations are hereinafter made about their cases in detail. However, compounds of the above various elements (B, Sb, Pb, Sn, Zn, and In) other than P are also usable in the same way as of the phosphorus compounds below.

There is no especial limitation with regard to raw materials for supplying the phosphorus compound, and, for example, there can favorably be used those which are cited as inorganic phosphorus compounds and organic phosphorus compounds, but it is particularly favorable to use water-soluble phosphorus compounds such as phosphoric acid, ammonium phosphate, and ammonium dihydrogenphosphate.

There are many unclear parts still at present with regard to the reason why making the phosphorus compound contained in the range of not more than 10 weight % in terms of phosphorus atom relative to the entity of the catalyst in the above way enables this catalyst to remove CO from exhaust gases with high efficiency for a long term, but this reason can be inferred as follows. That is to say, it can be considered that: if the catalyst is made to contain the phosphorus compound in the specific ratio as in the present invention, then deteriorations in physical properties (e.g. specific surface area, pore structure, crystal structure) of the catalyst itself, which easily occur in the case of long-term exposure of the catalyst to about 300 to about 500° C. high-temperature exhaust gases containing high-concentrated oxygen and water vapor, are inhibited and, as a result, deteriorations in performances of the catalyst itself can be inhibited. Therefore, a catalyst having the resistance to thermal load is obtained without increasing the quantity of the supported noble metal, and the resultant catalyst can maintain high activity even if exposed for a long term under a flow of the high-temperature exhaust gases containing high-concentrated oxygen and water vapor.

Although there is no especial limitation with regard to methods for making the catalyst contain the phosphorus compound, for example, the catalyst may be made to contain the phosphorus compound by adding the above phosphorus compound in the step of molding the support, or it is also possible to make the catalyst contain the phosphorus compound by using a starting material containing phosphorus when producing the support. In addition, it is also possible to make the catalyst contain the phosphorus compound by immersing the support into an aqueous solution containing the raw materials for supplying the phosphorus compound similarly to means as used for production of conventional catalysts.

There is no especial limitation with regard to the order of making the catalyst contain the phosphorus compound, either, and the catalyst may be made to contain the phosphorus compound either simultaneously with supporting the catalytic components A and/or B or after supporting the catalytic components A and B, so the catalyst can be made to contain the phosphorus compound in various orders, but it is favorable to make the catalyst contain the phosphorus compound before supporting the catalytic components A and/or B.

There is no especial limitation with regard to the form in which the phosphorus compound is contained in the support, and the phosphorus compound may be contained quantitatively substantially evenly in the support, or the contained form may be such that the concentration of the phosphorus compound as contained has a concentration gradient (concentration distribution), for example, the content is high near outer surfaces of the support, but becomes lower toward inside the support. However, above all, it is favorable that the phosphorus compound is contained quantitatively substantially evenly in the support.

(Glass Fibers, Whiskers, and/or Silica Particles):

The addition of the glass fibers, whiskers, and/or silica particles as other components D to the catalyst according to the present invention enhances the mechanical strength of this catalyst itself. Therefore, the deterioration of the catalyst itself, which easily occurs in the case of long-term use, becomes difficult to occur and, as a result,. it becomes possible to maintain high CO removal purification efficiency more stably for a long term. In addition, it becomes possible to form the catalyst into a still finer structure (of which the wall thickness is thin, and the shape of the opening portions is still smaller) and, as a result, it is possible to more enhance the efficiency of the contact between CO in exhaust gases and surface of the catalyst and to thus make the shape of the catalyst more effective to remove CO with high efficiency.

Hereupon, the "glass fibers, whiskers, and/or silica particles" means "at least one member selected from the group consisting of glass fibers, whiskers, and silica particles".

Glass Fibers:

Although glass which is usable as the main constitutional material of the glass fibers is not especially limited, its examples include quartz glass, soda-lime glass, and borosilicate glass. The glass may be used either alone respectively or in combinations with each other. Incidentally, materials other than glass may be contained as additives in the glass fibers.

As to the glass fibers, although their shape is not especially limited, usable examples thereof include those which have an average diameter of 1 to 100 μm, an average length of 5 to 400 μm, and an aspect ratio (average length/average diameter) of 2 to 50.

Whiskers:

Although not especially limited, examples of constitutional materials of the whiskers include: metal whiskers such as tungsten, iron, and nickel; and silicon carbide, silicon nitride, aluminum oxide, beryllium oxide, boron carbide, titanium carbide, potassium titanate, and calcium phosphate. These may be used either alone respectively or in combinations with each other.

As to the whiskers, although their shape is not especially limited, usable examples thereof include those which have an average diameter of 0.05 to 100 μm, an average length of 1 to 400 μm, and an aspect ratio (average length/average diameter) of 10 to 150.

Silica Particles:

Conventionally commonly known particles containing silica components are usable as the silica particles. In addition, the particulate shape of the silica particles may be any shape and is not especially limited.

Although not especially limited, the average particle diameter of the silica particles is, for example, favorably in the range of 5 to 100 nm.

Containing the Glass Fibers, Whiskers, and/or Silica Particles:

Although there is no especial limitation with regard to methods for making the catalyst contain the glass fibers, whiskers, and/or silica particles, examples thereof include: a method involving adding the above glass fibers, whiskers, and/or silica particles in the step of molding the materials of the support into the honeycomb shape; and a method involving adding the above glass fibers, whiskers, and/or silica particles in the step of preparing a powder of the materials of the support.

Although the content of the glass fibers, whiskers, and/or silica particles in the catalyst is not especially limited, specifically the total content of these materials relative to the entity of the catalyst is favorably in the range of 1 to 30 weight %, more favorably 2 to 20 weight %, still more favorably 4 to 10 weight %. In the case where the total content of the glass fibers, whiskers, and/or silica particles in the catalyst is less than 1 weight %, there is a possibility that the effect of enhancing the mechanical strength of this catalyst itself may be low. In the case where this total content is more than 30 weight %, there is a possibility that the content of the components of the support may relatively decrease to such a degree that the functions as the catalyst and the support cannot sufficiently be obtained.

<Preparation of Catalyst and its Properties>

The catalyst for purification of exhaust gases, according to the present invention, is, for example, obtainable by a process including the steps of: supporting the catalytic component (from the above various supplying raw materials) in a predetermined supporting quantity on the honeycomb support having porous surface layers (also including the porous-structural monolithically molded type honeycomb support), and then subjecting the resultant product to drying and calcining treatments. The drying can usually be carried out by treatment under air atmosphere, nitrogen atmosphere, or flows of these gases in the temperature range of 50 to 200° C. for 1 to 24 hours. The calcination can be carried out by heat-treatment in the temperature range of 200 to 900° C. for 1 to 10 hours. The calcination is usually carried out under air atmosphere or air flow, but it is also possible to replace air with nitrogen or gases including reducible gases such as hydrogen.

In the case where the catalyst for purification of exhaust gases according to the present invention is the catalyst including the honeycomb support and the catalytic component supported thereon, this catalyst is a honeycomb-structured catalyst of which the inner walls have porous surface layers similarly to the above honeycomb support.

In the case where the catalyst for purification of exhaust gases according to the present invention is the catalyst including the honeycomb support and the catalytic component supported thereon, the shape and measurements of this catalyst are basically the same as those of the honeycomb support. In addition, the catalyst for purification of exhaust gases according to the present invention may differ from the honeycomb support in some of their behavior and states and properties according to the kind or quantity of the supported catalytic component and the supporting treatment conditions, but, as to many of the behavior and states and properties, there is made no substantial difference between measured values of the honeycomb support and of the catalyst according to the present invention. Specifically, for example, the honeycomb support and the catalyst according to the present invention can usually be said to have almost the same values in respect to such as the inner wall thickness, porous surface layer thickness, length in a gas flow direction, one-edge length of gas passageways (opening size), opening ratio, compression fracture strength, total pore volume, and specific surface area, although there is also a case where the catalyst according to the present invention differs to a certain extent from the honeycomb support according to such as quantity of the supported catalytic component.

The catalyst for purification of exhaust gases according to the present invention is, as aforementioned, a catalyst having a honeycomb structure as shown in FIG. 1. Hereinafter, with respect to the catalyst according to the present invention, detailed explanations are specifically made about its inner wall thickness, length in a gas flow direction, opening size (one-edge length of gas passageways), opening ratio, compression fracture strength, total pore volume, specific surface area, and porous surface layer thickness.

(Inner Wall Thickness and Porous Surface Layer Thickness):

As to the catalyst according to the present invention, its inner wall thickness (thickness of a whole section of each inner wall) is favorably less than 2 mm, more favorably in the range of 0.03 to 1 mm, still more favorably 0.05 to 0.8 mm, particularly favorably 0.1 to 0.6 mm. In the case where the above inner wall thickness is too thin, the mechanical strength is so low that the handling is difficult in such as operations of equipping the catalyst to apparatuses for purification of exhaust gases and to catalyst receptacles. In the case where the inner wall thickness is too thick, the reaction efficiency is low, and further the pressure drop is much. When the inner wall thickness is thick, the $SO_2$-oxidizing ratio is so high that the aforementioned unfavorable effects of $SO_3$ are remarkable.

Furthermore, in the case where the aforementioned monolithically molded type porous honeycomb support is used as the honeycomb support as referred to in the present invention, the inner wall thickness (thickness of a whole section of each inner wall) of the catalyst according to the present invention is favorably in the range of 0.1 to 0.5 mm, more favorably 0.2 to 0.4 mm. If the inner wall thickness satisfies the above range in the case where the monolithically molded type porous honeycomb support is used, then there can be obtained excellent effects such that: a catalyst having mechanical strength enough for practical use can be obtained, and also the exhaust gas purification can be carried out without increasing the pressure drop, and further it becomes possible to purify exhaust gases with good efficiency while suppressing the $SO_2$-oxidizing ratio. On the other hand, in the case where the inner wall thickness is less than 0.1 mm, the mechanical strength may be so low that the handling is difficult in cases of placing and equipping the catalyst into catalyst reactors such as apparatuses for purification of exhaust gases. In the case where the inner wall thickness is more than 0.5 mm, not only the catalytic reaction efficiency but also the exhaust gas purification efficiency may be low, and further the pressure drop may be much, so it may become impossible to carry out efficient purification, and further, the $SO_2$-oxidizing ratio may be so high that the unfavorable effects of $SO_3$ are remarkable.

The catalyst according to the present invention is favorably such that surface layers of at least 0.01 mm of its inner walls are porous (that is, a catalyst for purification of exhaust gases such that its inner walls have their respective porous surface layers of at least 0.01 mm in thickness), and this thickness of each porous surface layer is more favorably at least 0.02 mm, still more favorably at least 0.03 mm. If surface layers of at least 0.01 mm of the inner walls are porous, then there can be obtained excellent effects such that the catalytic component can be retained in surface layers of the catalyst in an enough quantity needed for purification of exhaust gases. On the other hand, in the case where the thickness of each porous surface layer is less than 0.01 mm, it may be impossible to sufficiently support the catalytic component, so the catalytic activity may be low. Incidentally, the above porous surface layer may exist in both-side surfaces of each inner wall, or in only a one-side surface of each inner wall, but favorably exists in both-side surfaces. In addition, in the case where the above porous surface layer exists in only a one-side surface of each inner wall, it is enough that this existing porous surface layer satisfies the above range, and even in the case where the above porous surface layer exists in both-side surfaces of each inner wall, it is enough that a porous surface layer satisfying the above range exists in at least a one-side surface, but it is favorable that such a porous surface layer as satisfies the above range exists in both-side surfaces.

In the present invention, it doesn't matter whether the above inner wall thickness and further the above porous surface layer thickness are the same throughout the whole of the catalyst or not. Whichever case will do if it satisfies the above range.

The thickness of the outer circumferential wall of the catalyst for purification of exhaust gases according to the present invention is not limited by the inner wall thickness conditions. In consideration of such as total strength and handling property, the thickness of the outer circumferential wall can be set at a sufficient thickness (for example, in the range of 1 to 5 mm) that is thicker than the inner wall thickness.

(Length in Gas Flow Direction):

As to the catalyst according to the present invention, its length in a gas flow direction is favorably in the range of 25 to 300 mm, more favorably 35 to 250 mm, still more favorably 50 to 200 mm. If the length in a gas flow direction satisfies the above range, then there can be obtained excellent effects such that the exhaust gas purification can be carried out without increasing the pressure drop. On the other hand, in the case where the length in a gas flow direction is shorter than 25 mm, the strength may be so weak that the handling is difficult. In the case where this length is longer than 300 mm, the pressure drop may be much.

Furthermore, in the case where the aforementioned monolithically molded type porous honeycomb support is used as the honeycomb support as referred to in the present invention, the length of the catalyst according to the present invention in a gas flow direction is favorably in the range of 50 to 200 mm, more favorably 60 to 180 mm. If the length in a gas flow direction satisfies the above range in the case where the monolithically molded type porous honeycomb support is used, then there can be obtained excellent effects such that: a catalyst having mechanical strength enough for practical use can be obtained, and also the exhaust gas purification can be carried out without increasing the pressure drop. On the other hand, in the case where the length in a gas flow direction is shorter than 50 mm, the mechanical strength may be so low that various handlings are difficult. In the case where the length in a gas flow direction is longer than 200 mm, the pressure drop may be much, so it may become impossible to carry out efficient purification of exhaust gases.

Incidentally, in the present invention, the above length in a gas flow direction is treated as a value relating to the catalyst during the purification of exhaust gases. Accordingly, for example, in the case where at least two pieces of catalyst are piled in a gas flow direction and thereby used as a catalyst layer, the length in a gas flow direction means not that of each piece of catalyst but that in total of the above at least two pieces of catalyst as piled.

The catalyst for purification of exhaust gases according to the present invention is favorably such that: the length in a gas flow direction satisfies the above range (25 to 300 mm), and further the thickness of the porous surface layers possessed by the inner walls also satisfies the above range (at least 0.01 mm). Above all, in the case where the catalyst according to the present invention involves the use of the monolithically molded type porous honeycomb support, this catalyst is favorably such that: the length in a gas flow direction satisfies the above range (50 to 200 mm), and further the inner wall thickness also satisfies the above range (0.1 to 0.5 mm). If the above two conditions are satisfied at the same time, then there can be obtained excellent effects such that: a catalyst having mechanical strength enough for practical use can be obtained, and also the exhaust gas purification can be carried out at a low pressure drop, and further it becomes possible to purify exhaust gases with good efficiency while suppressing the $SO_2$-oxidizing ratio.

(Opening Size (One-Edge Length of the Gas Passageways)):

As to the catalyst according to the present invention, its opening size (one-edge length of the gas passageways) in a section perpendicular to a gas flow direction is favorably in the range of 1.0 to 3.0 mm, more favorably 1.5 to 2.5 mm. The "one-edge length of the gas passageways", as herein referred to, means a one-edge length of a square in the case where the shape of the gas passageways in the above section is the square, but, in the present invention, the shape of the gas passageways is not especially limited to the square. For example adoptable are various other patterns such as rectangles, parallelograms, various (regular) polygons, and curved shapes (e.g. circles, ovals, and ellipses). Therefore, in the case where the shape of the gas passageways in the above section is among these other patterns, for example, if the shape is the rectangle, then it is favorable that both lengths of its long and short sides are adjusted so as to come in the above range. In cases of the other shapes, it is favorable that their diameters are adjusted so as to come in the above range. In the case where the above one-edge length of the gas passageways is narrower than 1.0 mm, the pressure drop may be excessively much. In the case where the above one-edge length of the gas passageways is wider than 3.0 mm, the mechanical strength may be so low that various handlings are difficult, and further, not only the catalytic reaction efficiency but also the exhaust gas purification efficiency may be low.

Incidentally, as to the catalyst for purification of exhaust gases according to the present invention, though not especially being limited, the number of the gas passageways as can be opened through the catalyst is for example favorably in the range of 1,800 to 18,000, more favorably 2,000 to 16,000, per area of 150 mm×150 mm of a section perpendicular to a gas flow direction.

(Opening Ratio):

As to the catalyst according to the present invention, its opening ratio (ratio of sectional area of the gas passageways to area of the whole of the following section) in a section perpendicular to a gas flow direction is favorably in the range of 60 to 80%, more favorably 65 to 75%. If the opening ratio satisfies the above range, then there can be obtained excellent effects such that: a catalyst having mechanical strength enough for practical use can be obtained, and also the exhaust gases and the catalyst can be brought into contact with each other so efficiently that high purification efficiency can be obtained even if the quantity of the catalytic component is small. On the other hand, in the case where the opening ratio is less than 60%, the mechanical strength may be so low that various handlings are difficult. In the case where the opening ratio is more than 80%, the pressure drop may be too much. Incidentally, in the present invention, the above opening ratio is treated as a value relating to the catalyst during the purification of exhaust gases. Accordingly, for example, in the case where at least two pieces of catalyst are arranged in a direction of a plane perpendicular to a gas flow direction and thereby used as a catalyst layer, the opening ratio means not that of each piece of catalyst but that in total of the above at least two pieces of catalyst as arranged. However, usually, in the case where an identical catalyst is used with at least two pieces thereof arranged, the total opening ratio may be regarded as the same as the opening ratio of each piece of catalyst.

(Compression Fracture Strength):

As to the catalyst according to the present invention, its compression fracture strength is favorably not less than 0.3 MPa, more favorably not less than 0.4 MPa, still more favorably not less than 0.6 MPa. In the case where the compression fracture strength is less than 0.3 MPa, the mechanical strength may be so low that various handlings are difficult.

Giving explanations more specifically about the above compression fracture strength, as is shown by the arrow in FIG. 2, the compression fracture strength against a load from a direction perpendicular to a gas flow direction (compression fracture strength in a direction perpendicular to a gas flow direction) is favorably not less than 0.3 MPa, more favorably not less than 0.5 MPa, still more favorably not less than 0.7 MPa. In addition, as is shown by the arrow in FIG. 3, the compression fracture strength against a load from a gas flow direction (compression fracture strength in a gas flow direction) is favorably not less than 1.0 MPa, more favorably not less than 2.0 MPa, still more favorably not less than 3.0 MPa.

The catalyst for purification of exhaust gases according to the present invention is favorably such that: the opening size (one-edge length of the gas passageways) (or sectional area of the gas passageways) satisfies the above range (1.0 to 3.0 mm (in the case of the sectional area, 1.0 to 9.0 mm²)), and besides, the opening ratio also satisfies the above range (60 to 80%), and further the compression fracture strength also satisfies the above range (not less than 0.3 MPa). If the above three conditions are satisfied at the same time, then there can be obtained excellent effects such that: a catalyst having mechanical strength enough for practical use can be obtained, and also it becomes possible to efficiently bring the exhaust gases and the catalyst into contact with each other.

(Total Pore Volume and Average Pore Diameter):

The catalyst for purification of exhaust gases according to the present invention is a catalyst having porous surface layers containing fine pores. Such as quantity and size of the pores have influences on such as: flowing-through of exhaust gases; supporting of the catalytic component particles; diffusion of exhaust gases inside the support; catalytic activity; exhaust gas purification efficiency; and mechanical strength.

As to the catalyst according to the present invention, its total pore volume is favorably in the range of 0.20 to 0.80 cm³/g, more favorably 0.25 to 0.75 cm³/g, still more favorably 0.30 to 0.60 cm³/g. In the case where the above total pore volume is smaller than 0.20 cm³/g, there is a possibility that: the diffusion of exhaust gases inside the catalyst may not be promoted, so the catalytic activity may be low, and it may therefore be impossible to obtain sufficient exhaust gas purification efficiency. In the case where the above total pore volume is larger than 0.80 cm³/g, there is a possibility that: the exhaust gas purification efficiency of such a degree as rewards this increase may not be obtained, and further, the mechanical strength of the catalyst may be rather low.

As to the catalyst according to the present invention, for the same reason as of the above total pore volume of the catalyst, it is favorable to arrange for the average pore diameter of the catalyst to also satisfy the following range. That is to say, the average pore diameter of the catalyst is favorably in the range of 0.010 to 0.50 μm, more favorably 0.010 to 0.030 μm, still more favorably 0.015 to 0.10 μm. In the case where the above average pore diameter is smaller than 0.010 μm, there is a possibility that: the diffusion of exhaust gases inside the catalyst may not be promoted, so the catalytic activity may be low, and it may therefore be impossible to obtain sufficient exhaust gas purification efficiency. In the case where the above average pore diameter is larger than 0.50 μm, there is a possibility that: the exhaust gas purification efficiency of such a degree as rewards this increase may not be obtained, and further, the mechanical strength of the catalyst may be rather low.

The catalyst according to the present invention is favorably such that the above total pore volume and the above average pore diameter both satisfy the above ranges.

Incidentally, the above values of the total pore volume and average pore diameter of the catalyst are values as measured by the mercury penetration method.

Although not especially limited, examples of processes for preparing the catalyst in a manner for the total pore volume and average pore diameter of the catalyst to come in the above-mentioned desired ranges include: ① a process in which a powder of a material (becoming porous) of the support is prepared with the particle diameters of this powder being fittingly controlled; ② a process in which, in the case where a molding assistant (e.g. starch), water, or a solution containing the catalytic component (which are conventionally added in the step of kneading the material (becoming porous) of the support) is kneaded together with the material of the support, the quantity of an additive (e.g. solvent which can dissolve the catalytic component) as added is controlled; and ③ a process in which such as a resin that can decompose or volatilize in the calcination step as carried out in the production of the support and in the calcination step as carried out after the step of supporting the catalytic component is beforehand added in the step of kneading the material of the support. In processes such as ① to ③ above, the quantities of various additives as used, the particle diameters of the powder, and various conditions such as kneading conditions may be set fittingly to obtain a catalyst having a desired total pore volume and a desired average pore diameter, but are favorably as follows. That is to say, as to the process ① above, the average particle diameter of the above powder is favorably controlled into the range of 0.5 to 50 μm, more favorably 1 to 30 μm. In the case where it deviates from these ranges, no catalyst containing desired pores (e.g. in total pore volume or average pore diameter) may be obtained. As to the process ② above, in the case where water or the solvent is used, the total quantity thereof as added is favorably controlled into the range of 5 to 200 mass %, more favorably 10 to 150 mass %, relative to the weight of the material of the support. In the case where this quantity of the addition is smaller than these ranges, no catalyst containing desired pores (e.g. in total pore volume or average pore diameter) may be obtained. In the case where this quantity of the addition is larger than these ranges, the moldability may be deteriorated. In the case where the molding assistant in the process ① above or the resin in the process ③ above is used, the total quantity thereof as added is favorably controlled into the range of 0.5 to 30 mass %, more favorably 1 to 20 mass %, relative to the weight of the material of the support. In the case where this quantity of the addition is smaller than these ranges, no catalyst containing desired pores (e.g. in total pore volume or average pore diameter) may be obtained. In the case where this quantity of the addition is larger than these ranges, the calorific value during the calcination may be so large that there occur problems of such as sintering of active components.

(Specific Surface Area):

Because the catalyst for purification of exhaust gases according to the present invention is a catalyst having porous surface layers containing fine pores, its specific surface area also has influences on such as performance of the catalyst. For efficient oxidation removal of CO (particularly, CO as contained in only a slight quantity in exhaust gases) on the catalyst, it is necessary to carry out the contact between the catalytic component (as supported on the support) and CO. It is favorable therefor to support the catalytic component to a still higher degree of dispersion to thus increase the exposed surfaces of the catalytic component, thereby increasing the contact area between the catalytic component and CO. From this viewpoint, the larger the specific surface area of the catalyst is, the more favorable it is. Specifically, this specific surface area is favorably not less than 20 $m^2/g$, more favorably not less than 30 $m^2/g$, still more favorably not less than 40 $m^2/g$. In the case where the above specific surface area is less than 20 $m^2/g$, there is a possibility that: the catalytic component cannot be supported to such a degree that it is well dispersed, therefore the efficiency of the contact between the catalytic component and CO and the catalytic activity may be so low that it may be impossible to obtain sufficient exhaust gas purification efficiency. On the other hand, even if the specific surface area is made excessively large, there is a possibility that: the efficiency of the contact between the catalytic component and CO or the catalytic activity cannot be enhanced by such a degree as rewards this increase of the specific surface area, but rather there may occur unfavorable effects such that: the accumulation of catalytically poisonous components increases, or the life time of the catalyst becomes short. From these viewpoints, though not especially being limited, the upper limit of the specific surface area of the catalyst is favorably 300 $m^2/g$, more favorably 250 $m^2/g$, still more favorably 200 $m^2/g$.

Incidentally, the above values of the specific surface area are values as measured by the BET method (BET single-point method).

Although not especially limited, examples of processes for preparing the catalyst in a manner for the specific surface area of the catalyst to come in the above-mentioned desired ranges include: ① a process in which the calcination temperature and the calcination time are controlled in the calcination step as carried out in the production of the support and in the calcination step as carried out after the step of supporting the catalytic component; and ② a process in which the quantity of the catalytic component being supported is controlled. In processes such as ① and ② above, various conditions such as the calcination temperature, the calcination time, and the supporting quantity may be set fittingly for the specific surface area to be a desired one, but are favorably as follows. That is to say, as to the process ① above, the calcination temperature is favorably controlled into the range of 20 to 650° C., more favorably 300 to 600° C. In the case where the calcination temperature is higher than these ranges, the specific surface area may be smaller than the above-mentioned desired ranges. In the case where the calcination temperature is lower than these ranges, sufficient catalytic activity may not be obtained. In addition, as to the process ① above, the calcination time (retention time of from attainment to a predetermined calcination temperature) is favorably controlled into the range of 1 to 20 hours, more favorably 2 to 10 hours. In the case where the calcination time is longer than these ranges, the specific surface area may be smaller than the above-mentioned desired ranges. In the case where the calcination time is shorter than these ranges, sufficient catalytic activity may not be obtained.

<Modes for Using the Catalyst>

The catalyst for purification of exhaust gases, according to the present invention, is a catalyst having a honeycomb structure, but, furthermore, is favorably a honeycomb catalyst which includes the honeycomb support and the catalytic component supported thereon. In detail, as is aforementioned, the catalyst for purification of exhaust gases, according to the present invention, may be a catalyst which includes the honeycomb support and the catalytic component supported thereon, wherein the honeycomb support has porous surface layers and is obtained by a process including the steps of: coating materials (which will form the porous structures) of the support onto surfaces of such as inner walls of a honeycomb-shaped framework base material; and then, for example, calcining them, if necessary. Or the catalyst for purification of exhaust gases, according to the present invention, may be a catalyst which includes the honeycomb support and the catalytic component supported thereon, wherein the honeycomb support is a monolithically molded type porous-structural honeycomb support (porous honeycomb support) as obtained by a process including the steps of: extrusion-molding materials (which will form the porous structure) of the support into a desired form with such as an extrusion molding machine; and then, for example, calcining them, if necessary. Thus, there is no especial limitation. Incidentally, in the case where the above framework base material is used, the measurement of such as specific surface area and total pore volume of the catalyst is carried out excluding this framework base material portion.

As to the catalyst for purification of exhaust gases according to the present invention, any of the above forms of catalyst is usually used in a state placed in a catalytic reactor made of such as metal. The catalytic reactor is provided with an exhaust-gas-introducing inlet and an exhaust-gas-discharging outlet, and with a structure such that the exhaust gases can efficiently come into contact with the catalyst as placed inside.

As to the catalyst for purification of exhaust gases according to the present invention, at least two pieces of catalyst may be piled in a gas flow direction and/or arranged in a direction perpendicular to a gas flow direction, and thereby used as a catalyst layer, or one piece of catalyst having such as a desired form may be used as a catalyst layer. In the case where at least two pieces of catalyst are used, it is, for example, possible to adjust the length in a gas flow direction to thereby enhance the strength in a gas flow direction. In addition, it is, for example, possible to make the sectional area in a direction perpendicular to a gas flow direction large.

(Process for Purification of Exhaust Gases):

The process for purification of exhaust gases, according to the present invention, is a process for purification of exhaust gases to remove CO therefrom, and is characterized by comprising the step of bringing the exhaust gases into contact with the catalyst for purification of exhaust gases according to the present invention.

For example, applicable to the case of carrying out the process for purification of exhaust gases according to the present invention are arts for purification of exhaust gases with conventional metal-oxide-supported noble metal catalysts. Usually, the catalytic reactor in which the catalyst is placed is set along the discharging way of such as exhaust gases. The exhaust gases undergo predetermined catalysis by coming into contact with surfaces of the catalyst when passing through the catalytic reactor.

The process for purification of exhaust gases, according to the present invention, can simultaneously purify not only the CO but also the unburned volatile organic compounds that are contained in the exhaust gases.

In the case of purifying the exhaust gases with the catalyst for purification of exhaust gases according to the present invention, the efficiency of the purification of exhaust gases with the catalyst is enhanced by properly setting conditions such as temperature, space velocity, linear velocity, and pressure drop of the exhaust gases. For example, it is favorable to purify the combustion exhaust gases of 250 to 600° C. in gas temperature and 30,000 to 1,000,000 $H^{-1}$ in space velocity. As to the gas temperature, the range of 300 to 550° C. can favorably be adopted, and as to the space velocity, the range of 50,000 to 500,000 $H^{-1}$ can favorably be adopted. Furthermore, the Linear Velocity (LV) is favorably in the range of 0.5 to 10 m/s (Normal), more favorably 1.0 to 8.0 m/s (Normal). In addition, it is favorable to arrange for the pressure drop to be in the range of not more than 100 mmH$_2$O, more favorably not more than 80 mmH$_2$O. Furthermore, purification conditions of dust concentration not more than 10 mg/m$^3$ (Normal) are favorable.

As to the process for purification of exhaust gases according to the present invention, it is favorably arranged that, of the above various conditions for purification of exhaust gases, particularly, the temperature, the pressure drop, and the linear velocity of the exhaust gases will satisfy the above ranges. Furthermore, if it is arranged that these three conditions will be satisfied at the same time, then there can be obtained great effects such that the exhaust gas purification efficiency can still more be enhanced by synergistic effects.

In the process for purification of exhaust gases according to the present invention, before and/or after the step for purification of exhaust gases with the catalyst for purification of exhaust gases according to the present invention, another step for purification of exhaust gases with another kind of catalyst for purification of exhaust gases may be combined. Favorable as this other step is a step which can efficiently purify components difficult to purify with the catalyst for purification of exhaust gases according to the present invention.

For example, in the case of purifying the exhaust gases containing the nitrogen oxides (NO$_x$) besides such as CO, this purification can be carried out by combining a step for purification of exhaust gases with a DeNO$_x$ catalyst and the step for purification of exhaust gases with the catalyst for purification of exhaust gases according to the present invention. If the purification is carried out in this way, in the case where the exhaust gases containing the CO and the nitrogen oxides (NO$_x$) are purified, then the nitrogen oxides (NO$_x$) can also efficiently be removed along with the CO. In addition, when the above exhaust gases containing the CO and the nitrogen oxides (NO$_x$) are purified, this purification is favorably carried out under an atmosphere excessively containing molecular oxygen.

Incidentally, in the above step for purification of exhaust gases with a DeNO$_x$ catalyst, the exhaust gases are brought into contact with a DeNO$_x$ catalyst in the presence of a reducing agent. Examples of the reducing agent include ammonia, urea, and hydrazine. These may be used either alone respectively or in combinations with each other. Although the quantity of the reducing agent as used may be set fittingly for the demanded nitrogen oxides (NO$_x$) removal ratio and is not especially limited, specifically, the molar ratio of the reducing agent to the nitrogen oxides (NO$_x$) in the exhaust gases (reducing agent/NO$_x$) is favorably less than 2, more favorably less than 1.5, still more favorably less than 1.2. In the case where the above molar ratio is not less than 2, there are disadvantages in that a large quantity of reducing agent will remain in gases after the nitrogen oxides (NO$_x$) removal step.

As examples of the above case where there are combined the step for purification of exhaust gases with the catalyst for purification of exhaust gases according to the present invention and the step for purification of exhaust gases with a DeNO$_x$ catalyst in the presence of a reducing agent on the occasion when the exhaust gases containing the CO and the NO$_x$ are purified, there can be cited: 1) a process comprising the steps of: bringing the exhaust gases into contact with the catalyst for purification of exhaust gases according to the present invention, thereby removing the CO from the exhaust gases; and then bringing the exhaust gases into contact with a DeNO$_x$ catalyst in the presence of a reducing agent, thereby removing the NO$_x$ from the exhaust gases; and 2) a process comprising the steps of: bringing the exhaust gases into contact with a DeNO$_x$ catalyst in the presence of a reducing agent, thereby removing the NO$_x$ from the exhaust gases; and then bringing the exhaust gases into contact with the catalyst for purification of exhaust gases according to the present invention, thereby removing the CO from the exhaust gases.

The former process 1) has the advantage of being able to more inhibit the activity of the catalyst for purification of exhaust gases according to the present invention from being deteriorated by SO$_x$. Specifically, the oxidation reaction of SO$_2$→SO$_3$ usually occurs also in the purification with a DeNO$_x$ catalyst. The deterioration by SO$_3$ in the activity of the catalyst for purification of exhaust gases according to the present invention is even more than by SO$_2$. If the catalyst for purification of exhaust gases according to the present invention is put upstream of the DeNO$_x$ catalyst, then it is expected that the above deterioration in the activity can be inhibited.

The latter process 2) has the advantage of being able to more decrease a surplus of the reducing agent (e.g. NH$_3$). Specifically, usually, the reducing agent (e.g. NH$_3$), as used for the purification with a DeNO$_x$ catalyst, gets concerned in the removal reaction of such as NO$_x$ and thereby decreases in quantity, but, depending on purification conditions, results in remaining unreacted to mingle into exhaust gases after the purification and is therefore problematic. However, the catalyst for purification of exhaust gases according to the present invention further has the ability to oxidize the reducing agent (e.g. NH$_3$). Thus, if the catalyst for purification of exhaust gases according to the present invention is put downstream of the above DeNO$_x$ catalyst, it is expected that the catalyst for purification of exhaust gases according to the present invention can oxidize the unreacted reducing agent to more decrease it. In addition, particularly, in the case where a high NO$_x$-removal ratio is demanded such as case where a strict emission regulation value is imposed, the use of this process 2) is very effective in that: the reducing agent (e.g. NH$_3$) can be excessively supplied to make the NO$_x$-removal efficiency with the DeNO$_x$ catalyst in the prior step as high as possible, and further a large quantity of reducing agent remaining unreacted can be removed with the catalyst for purification of exhaust gases according to the present invention in the posterior step.

Applicable to the above technique for purification of exhaust gases with the DeNO$_x$ catalyst is a technique as previously applied for a patent by the present applicant in Japan and disclosed in JP-A-235206/1998. The DeNO$_x$ catalyst as used in this technique comprises a combination of a catalytic component a (titanium oxide) and a catalytic component b (oxide of metal including vanadium or tungsten) and has a structure such that the catalytic component b is supported on the catalytic component a.

The process for purification of exhaust gases, according to the present invention, can be intended also for the exhaust gases containing the nitrogen oxides (NO$_x$) besides such as CO, as exhaust gases being purified, and can efficiently remove the CO even from such exhaust gases.

The process for purification of exhaust gases according to the present invention, which involves the use of the above catalyst for purification of exhaust gases according to the present invention, can also remove the NO$_x$ simultaneously with such as CO. In this case, favorably for enhancing the efficiency of the removal of the NO$_x$, this removal is carried out in the presence of the reducing agent such as ammonia, urea, and hydrazine. Furthermore, in these cases, for example, it is favorable to purify exhaust gases of 250 to 500° C. in gas temperature and 2,000 to 500,000 H$^{-1}$ in space velocity.

The process for purification of exhaust gases according to the present invention may be combined with publicly known processes for purification of exhaust gases as disclosed in such as JP-A-146991/1978, JP-A-065721/1987, and JP-B-004126/1994.

In the present invention, by use of the above catalyst for purification of exhaust gases according to the present invention as the catalyst for purification of the CO as contained in the exhaust gases, very high catalytic activity is obtained, and further, high purification efficiency can be achieved without increasing the quantity of the supported noble metal as a catalytic component. As a result, the process for purification of exhaust gases according to the present invention becomes a very effective process as a process for purification of CO-containing exhaust gases having a great space velocity as discharged from such as gas turbines.

Effects and Advantages of the Invention

The process for purification of exhaust gases, according to the present invention, is a process for purification of exhaust gases to remove CO therefrom with the catalyst having a honeycomb structure (honeycomb catalyst), in which the honeycomb catalyst having the specific shape and measurements is used and further the conditions for purification with this catalyst are fittingly set. Specifically, the temperature, the pressure drop, and the linear velocity of the exhaust gases are set in the specific conditions ranges when the exhaust gases are brought into contact with the above honeycomb catalyst having the specific shape and measurements. Therefore, the efficiency of the purification of the CO-containing exhaust gases can greatly be enhanced.

As to such as shape and measurements of the honeycomb catalyst as used, particularly, because the shapes of the catalyst such as opening size (one-edge length of gas passageways), opening ratio, and inner wall thickness, and further, length in a gas flow direction if necessary, are set in the specific measurements ranges, the CO removability can greatly be enhanced and, being involved therein, the quantity of the catalytic component including such as noble metal element as used can be saved so much that the SO$_2$-oxidizing ratio can also efficiently be suppressed. In addition, the mechanical strength and the durability can also be secured sufficiently.

As a result, it also becomes possible to efficiently purify the CO-containing exhaust gases, particularly, low-concentration-CO-containing exhaust gases having a CO concentration of not higher than 100 ppm, under conditions where the purification has ever been difficult to carry out by prior arts.

Furthermore, if, as the honeycomb catalyst, there is used a honeycomb catalyst which includes a support and a catalytic component supported thereon wherein the support has a honeycomb structure as provided with a porous structure in a surface layer and wherein the catalytic component includes a noble metal, then the catalytic component is so well supported also in inner wall portions constituting the gas passageways of the above support that the exhaust gas purification function of the catalytic component is sufficiently displayed. Above all, in the case where the monolithically molded type porous honeycomb support is used as the above support having a honeycomb structure, this support can support the (for example, finely particulate) catalytic component (including the noble metal) at a proper density on inner surfaces of the fine pore spaces existing in the inner walls of the gas passageways, and can therefore extremely efficiently purify exhaust gases, coming from the gas passageways into the fine pore spaces, by interaction between the catalytic component and the support component including such as a metal oxide (e.g. titanium-containing oxide).

DETAILED DESCRIPTION OF THE PREFERRED EMBODIMENTS

Hereinafter, the present invention is more specifically illustrated by the following examples of some preferred embodiments. However, the invention is not limited thereto.

The following are conditions for compositional analysis of catalysts produced in the below-mentioned Examples and Comparative Examples.

<Compositional Analysis of Catalysts>

The compositional analysis of the catalysts was carried out by fluorescent X-ray analysis under the following conditions:

Analyzer: product name: RIX2000, produced by Rigaku Corporation

Atmosphere around samples during the analysis: vacuum

Spin rate of samples: 60 rpm

X-ray source: Rh tubular globe

<Compression Fracture Strengths of Catalysts>

As to the compression fracture strengths of the catalysts, the sampled catalysts were measured under the below-mentioned measurement conditions by: a compression fracture strength against a load from a gas flow direction; and a compression fracture strength against a load from a direction perpendicular to the gas flow.

Measurement Conditions:

Measurement Device: AUTOGRAPH DSS-25T, Produced by Shimadzu Corporation

Speed: 3 mm/min

Figure 3:
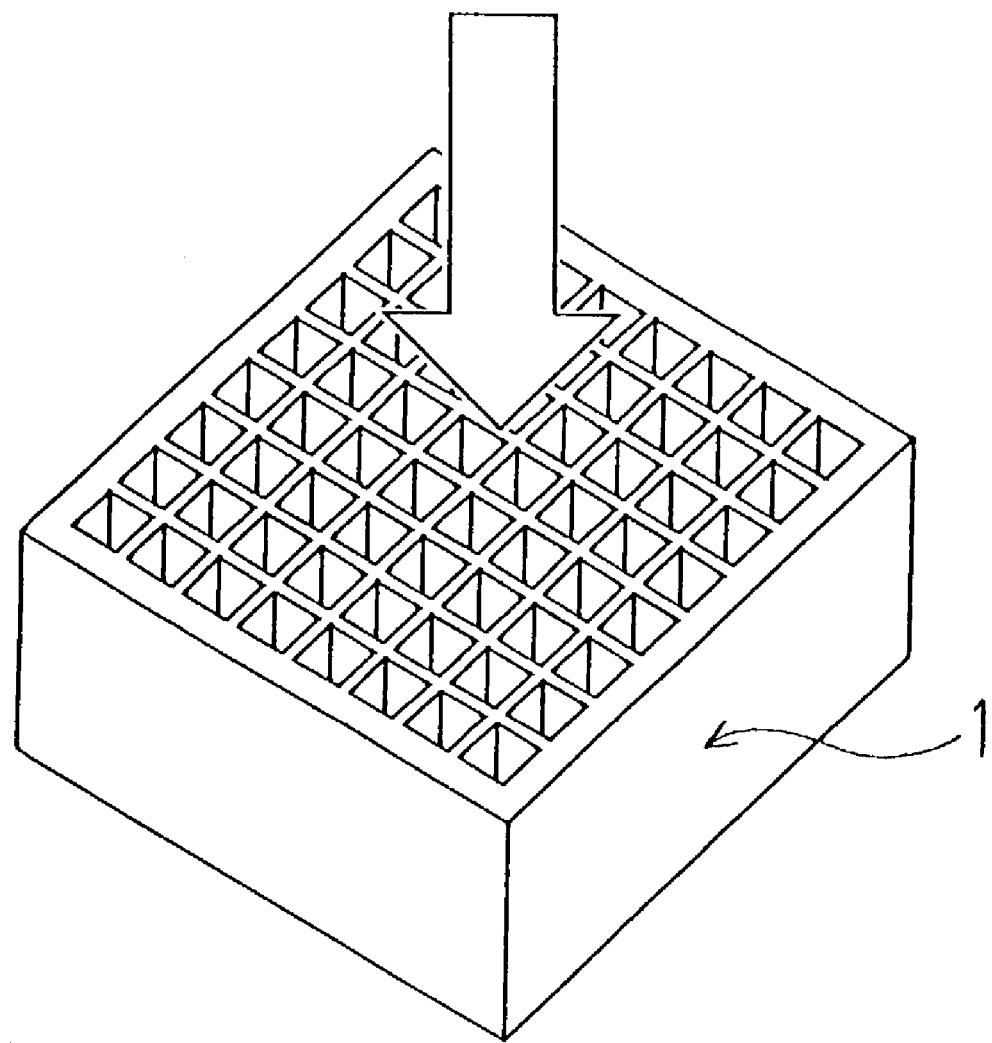
FIG. 3 is an image view showing a load as applied to the catalyst for purification of exhaust gases from a gas flow direction.

Incidentally, the directions of the loads to the samples are as follows. ① The "direction perpendicular to the gas flow" is, as shown in FIG. 2, a direction of a load in the case where the load is applied from a direction perpendicular to the side wall surface of the sample, in other words, a direction of a load in the case where the load is applied from a direction perpendicular to the gas flow through the sample. In addition, ② the "gas flow direction" is, as shown in FIG. 3, a direction of a load in the case where the load is applied from a direction perpendicular to a honeycomb cross section of the sample when this honeycomb cross section is placed up, in other words, a direction of a load in the case where the load is applied from a direction parallel to the gas flow through the sample.

Catalysts for Purification of Exhaust Gases

EXAMPLE 1-1

Preparation of Ti—Si-Composite Oxide:

An amount of 28.2 kg of Snowtex-20 (silica sol with an $SiO_2$ content of about 20 weight %, produced by Nissan Chemical Industries, Ltd.) was added to 700 liters of 10 weight % ammonia water, and then they were mixed together by stirring. Thereafter, 340 liters of a sulfuric acid solution of titanyl sulfate (125 g/liter as $TiO_2$, and sulfuric acid concentration=550 g/liter) was gradually added dropwise under agitation. The resultant gel was left alone for 3 hours, and then filtered off, and then washed with water, and then dried at 150° C. for 10 hours. The resultant product was calcined at 500° C., and then ground with a hammer mill to obtain a powder. In an X-ray diffraction chart of the resultant powder, neither clear characteristic peak of $TiO_2$ nor $SiO_2$ was seen, but a broad diffraction peak was seen, from which it was verified that the resultant powder was a titanium-silicon-composite oxide (Ti—Si-composite oxide) having an amorphous fine structure.

Production of Porous Honeycomb Support:

The above Ti—Si-composite oxide was used as the material of the support to produce a rectangular-solid-shaped porous honeycomb support as shown in FIG. 1. Specifically, to 20 kg of the above powder, there were added 1 kg of phenol resin and 400 g of starch (as a molding assistant) to mix them together. The resulting mixture was kneaded with a kneader and then extrusion-molded with an extrusion molding machine to obtain a honeycomb-shaped extrusion-molded structure having an external form size of 80 mm square, an opening size of 1.76 mm, an inner wall thickness of 0.35 mm, and a length of 500 mm. Thereafter, the resultant structure was dried at 80° C. and then calcined at 450° C. for 5 hours under air atmosphere to obtain a porous honeycomb support.

This porous honeycomb support has a latticed structure, as shown in FIG. 1, such that the opening size W of each exhaust gas passageway is 1.76 mm, and that the inner wall thickness T is 0.35 mm, and that the length L is 500 mm.

Production of Catalyst by Supporting Catalytic Component:

The above porous honeycomb support was cut off into a length of 100 mm and then impregnated with a hexaammineplatinum hydroxide solution and then dried. Next, the resultant product was calcined at 450° C. for 2 hours under air atmosphere to obtain a catalyst A comprising the porous honeycomb support on which Pt was supported as the catalytic component. This catalyst A had the same structure and measurements as of the above porous honeycomb support.

Incidentally, similarly to Example 1-1 in the following Examples and Comparative Examples, the structures and measurements of the resultant catalysts are the same as the structures which the honeycomb supports had before supporting the catalytic components thereon (but excluding such as treated by adjustment again in producing the catalysts, for example, "length in a gas flow direction").

Analysis of Catalyst:

The composition of the resultant catalyst A was analyzed. As a result, it was (Ti—Si-composite oxide):Pt=99.8:0.2 (weight ratio).

The catalyst A had an opening ratio of 67% and compression fracture strengths of 2.9 MPa in a gas flow direction and 0.9 MPa in a direction perpendicular to the gas flow.

In addition, the catalyst A had a specific surface area of 130 $m^2/g$ as measured by the BET single-point method, a total pore volume of 0.53 $cm^3/g$ as measured by the mercury penetration method, and an average pore diameter of 0.016 μm.

The average particle diameter of Pt, as measured with a transmission electron microscope, was smaller than 5 nm.

EXAMPLE 1-2

A catalyst B was obtained in the same way as of Example 1-1 except that the hexaammineplatinum hydroxide solution was replaced with a mixed solution of hexaammineplatinum hydroxide and magnesium acetate.

The composition of the resultant catalyst B was analyzed. As a result, it was (Ti—Si-composite oxide):Mg:Pt=98.9:1: 0.1 (weight ratio).

The catalyst B had an opening ratio of 67% and compression fracture strengths of 3.0 MPa in a gas flow direction and 0.91 MPa in a direction perpendicular to the gas flow.

In addition, the catalyst B had a specific surface area of 123 m$^2$/g as measured by the BET single-point method, a total pore volume of 0.52 cm$^3$/g as measured by the mercury penetration method, and an average pore diameter of 0.016 μm.

From the result of measurement with a transmission electron microscope, the average particle diameter of Pt was smaller than 5 nm.

EXAMPLE 1-3

In accordance with the same way as of Example 1-1 except to change the measurements of the extrusion-molded structure to opening size=2.34 mm, a catalyst C was obtained by producing a porous honeycomb support and then supporting thereon the catalytic component.

The composition of the resultant catalyst C was analyzed. As a result, it was (Ti—Si-composite oxide):Pt=99.8:0.2 (weight ratio).

The catalyst C had an opening ratio of 74% and compression fracture strengths of 2.5 MPa in a gas flow direction and 0.58 MPa in a direction perpendicular to the gas flow.

In addition, the catalyst C had a specific surface area of 130 m$^2$/g as measured by the BET single-point method, a total pore volume of 0.53 cm$^3$/g as measured by the mercury penetration method, and an average pore diameter of 0.016 μm.

From the result of measurement with a transmission electron microscope, the average particle diameter of Pt was smaller than 5 nm.

EXAMPLE 1-4

In accordance with the same way as of Example 1-1 except to use a commercially available titanium oxide powder (DT-51 (trade name), produced by Millennium Inorganic Chemicals Limited) as the material of the support, a catalyst D was obtained by producing a porous honeycomb support and then supporting thereon the catalytic component.

The composition of the resultant catalyst D was analyzed. As a result, it was TiO$_2$:Pt=99.8:0.2 (weight ratio).

The catalyst D had an opening ratio of 67% and compression fracture strengths of 4.9 MPa in a gas flow direction and 1.8 MPa in a direction perpendicular to the gas flow.

In addition, the catalyst D had a specific surface area of 75 m$^2$/g as measured by the BET single-point method, a total pore volume of 0.45 cm$^3$/g as measured by the mercury penetration method, and an average pore diameter of 0.080 μm.

From the result of measurement with a transmission electron microscope, the average particle diameter of Pt was smaller than 5 nm.

EXAMPLE 1-5

In accordance with the same way as of Example 1-1 except to use a mixed powder of a commercially available tungsten-oxide-containing titanium oxide powder (DT-52 (trade name), produced by Millennium Inorganic Chemicals Limited, with a WO$_3$ content of about 10 weight %) and the similarly commercially available titanium oxide powder (DT-51 (trade name), produced by Millennium Inorganic Chemicals Limited) as the material of the support, a catalyst E was obtained by producing a porous honeycomb support and then supporting thereon the catalytic component.

The composition of the resultant catalyst E was analyzed. As a result, it was TiO$_2$:WO$_3$:Pt =97.6:2.0:0.4 (weight ratio).

The catalyst E had an opening ratio of 67% and compression fracture strengths of 4.8 MPa in a gas flow direction and 1.7 MPa in a direction perpendicular to the gas flow.

In addition, the catalyst E had a specific surface area of 80 m$^2$/g as measured by the BET single-point method, a total pore volume of 0.45 cm$^3$/g as measured by the mercury penetration method, and an average pore diameter of 0.080 μm.

From the result of measurement with a transmission electron microscope, the average particle diameter of Pt was smaller than 5 nm.

EXAMPLE 1-6

The same porous honeycomb support as of Example 1-1 was used. This porous honeycomb support was cut off into a length of 100 mm and then impregnated with a mixed solution of a hexaammineplatinum hydroxide solution and magnesium acetate, and then dried, and then calcined at 450° C. for 2 hours under air atmosphere, and subsequently further impregnated with an aqueous ammonium metatungstate solution, and then dried, and then calcined at 450° C. for 2 hours under nitrogen atmosphere, thus obtaining a catalyst F.

The composition of the resultant catalyst F was analyzed. As a result, it was (Ti—Si-composite oxide):WO$_3$:Mg:Pt=97.8:1.0:1.0:0.2 (weight ratio).

The catalyst F had an opening ratio of 67% and compression fracture strengths of 3.0 MPa in a gas flow direction and 0.9 MPa in a direction perpendicular to the gas flow.

In addition, the catalyst F had a specific surface area of 120 m$^2$/g as measured by the BET single-point method, a total pore volume of 0.50 cm$^3$/g as measured by the mercury penetration method, and an average pore diameter of 0.016 μm.

From the result of measurement with a transmission electron microscope, the average particle diameter of Pt was smaller than 5 nm.

EXAMPLE 1-7

In accordance with the same way as of Example 1-1 except to use a commercially available alumina powder (PURALOX NGa-150 (trade name), produced by SASOL Limited) as the material of the support, a catalyst G was obtained by producing a porous honeycomb support and then supporting thereon the catalytic component.

The composition of the resultant catalyst G was analyzed. As a result, it was AL$_2$O$_3$:Pt 99.8:0.2 (weight ratio).

The catalyst G had an opening ratio of 67% and compression fracture strengths of 4.4 MPa in a gas flow direction and 1.6 MPa in a direction perpendicular to the gas flow.

In addition, the catalyst G had a specific surface area of 150 m$^2$/g as measured by the BET single-point method, a total pore volume of 0.40 cm$^3$/g as measured by the mercury penetration method, and an average pore diameter of 0.012 μm.

From the result of measurement with a transmission electron microscope, the average particle diameter of Pt was smaller than 5 nm.

COMPARATIVE EXAMPLE 1-1

In accordance with the same way as of Example 1-1 except to change the measurements of the extrusion-molded structure to opening size=4.55 mm and inner wall thickness=0.4 mm, a catalyst H was obtained by producing a porous honeycomb support and then supporting thereon the catalytic component.

The composition of the resultant catalyst H was analyzed. As a result, it was (Ti—Si-composite oxide):Pt=99.8:0.2 (weight ratio).

The catalyst H had an opening ratio of 83% and compression fracture strengths of 0.49 MPa in a gas flow direction and 0.11 MPa in a direction perpendicular to the gas flow.

In addition, the catalyst H had a specific surface area of 130 $m^2/g$ as measured by the BET single-point method, a total pore volume of 0.53 $cm^3/g$ as measured by the mercury penetration method, and an average pore diameter of 0.016 µm.

From the result of measurement with a transmission electron microscope, the average particle diameter of Pt was smaller than 5 nm.

EXAMPLE 2-1

Preparation of Titanium Oxide:

While 600 liters of 11 weight % ammonia water was stirred, 48 liters of aqueous titanium chloride solution (200 g/liter as $TiO_2$) was gradually added dropwise thereinto. The resultant precipitate was filtered off, and then washed with water, and then dried at 100° C. for 12 hours. The resultant product was calcined at 450° C. for 3 hours under air atmosphere, and then ground with a hammer mill to obtain a powder comprising titanium oxide. In an X-ray diffraction chart of the resultant powder, a characteristic diffraction peak of anatase-type titanium oxide was seen, from which it was verified that the resultant powder was a titanium oxide having an anatase-type crystal structure.

Production of Porous Honeycomb Support:

A porous honeycomb support was produced in the same way as of Example 1-1 except to use the above powder.

Production of Catalyst by Supporting Catalytic Component:

The above porous honeycomb support was cut off into a length of 100 mm and then impregnated with a hexaammineplatinum hydroxide solution and then dried. Next, the resultant product was calcined at 450° C. for 2 hours under air atmosphere to obtain a catalyst I comprising the porous honeycomb support on which Pt was supported as the catalytic component A.

Analysis of Catalyst:

The composition of the resultant catalyst I was analyzed. As a result, it was $TiO_2$:Pt =99.8:0.2 (weight ratio).

The catalyst I had an opening ratio of 67% and compression fracture strengths of 4.9 MPa in a gas flow direction and 1.8 MPa in a direction perpendicular to the gas flow.

In addition, the catalyst I had a specific surface area of 120 $m^2/g$ as measured by the BET single-point method, a total pore volume of 0.39 $cm^3/g$ as measured by the mercury penetration method, and an average pore diameter of 0.035 µm.

From the result of measurement with a transmission electron microscope, the average particle diameter of Pt was smaller than 5 nm.

EXAMPLE 2-2

An amount of 120 liters of aqueous titanium sulfate solution (180 g/liter as $TiO_2$) was boiled in the range of 105 to 110° C. for 5 hours and then cooled to not higher than 50° C. and then neutralized with ammonia water to obtain a metatitanic acid slurry. The resultant product was evaporated to dryness as it was and then calcined at 800° C. and then ground with a hammer mill to obtain a powder comprising titanium oxide. In an X-ray diffraction chart of the resultant powder, a characteristic diffraction peak of anatase-type titanium oxide was seen, from which it was verified that the resultant powder was a titanium oxide having an anatase-type crystal structure.

A porous honeycomb support was produced in the same way as of Example 2-1 except to use the above powder comprising titanium oxide.

Next, the above porous honeycomb support was cut off into a length of 100 mm and then immersed into a dinitrodiammineplatinum solution, and then dried and calcined in the same way as of Example 2-1, thus obtaining a catalyst J.

The composition of the resultant catalyst J was analyzed. As a result, it was $TiO_2$:Pt=99.8:0.2 (weight ratio).

The catalyst J had an opening ratio of 67% and compression fracture strengths of 4.9 MPa in a gas flow direction and 1.8 MPa in a direction perpendicular to the gas flow.

In addition, the catalyst J had a specific surface area of 25 $m^2/g$ as measured by the BET single-point method, a total pore volume of 0.34 $cm^3/g$ as measured by the mercury penetration method, and an average pore diameter of 0.031 µm.

From the result of measurement with a transmission electron microscope, the average particle diameter of Pt was smaller than 5 nm.

EXAMPLE 2-3

To a solution as prepared by mixing 3.3 kg of aqueous ammonium metatungstate solution (having a content of 50 weight % as $WO_3$), 110 kg of 25 weight % ammonia water and 2.2 kg of water together, there was gradually added dropwise 215 liters of aqueous sulfuric acid solution of titanyl sulfate (70 g/liter as $TiO_2$, and sulfuric acid concentration =310 g/liter) under vigorous agitation, thus obtaining a gelled product. Then, this product was washed with water, dried, calcined, and ground in the same way as of Example 2-1, thus obtaining a titanium-tungsten oxide powder (Ti—W-close mixture).

A porous honeycomb support was produced in the same way as of Example 2-1 except to use the above powder comprising the above Ti—W-close mixture.

Next, the above porous honeycomb support was cut off into a length of 100 mm and then immersed into a mixed solution of tetraamminepalladium and calcium acetate, and then dried and calcined in the same way as of Example 2-1, thus obtaining a catalyst K.

The composition of the resultant catalyst K was analyzed. As a result, it was (Ti—W-close mixture):Ca:Pd=98.8:1:0.2 (weight ratio).

The catalyst K had an opening ratio of 67% and compression fracture strengths of 4.8 MPa in a gas flow direction and 1.7 MPa in a direction perpendicular to the gas flow.

In addition, the catalyst K had a specific surface area of 83 $m^2/g$ as measured by the BET single-point method, a total pore volume of 0.30 $cm^3/g$ as measured by the mercury penetration method, and an average pore diameter of 0.017 µm.

From the result of measurement with a transmission electron microscope, the average particle diameter of Pd was smaller than 5 nm.

EXAMPLE 2-4

A catalyst L was obtained in the same way as of Example 2-1 except that the powder comprising the titanium oxide having an anatase-type crystal structure as prepared in Example 2-1 was replaced with a commercially available titanium oxide powder (rutile-type titanium oxide, produced by Fuji Titanium Industries, Co., Ltd.).

The composition of the resultant catalyst L was analyzed. As a result, it was $TiO_2$:Pt=99.8:0.2 (weight ratio).

The catalyst L had an opening ratio of 67% and compression fracture strengths of 4.4 MPa in a gas flow direction and 1.3 MPa in a direction perpendicular to the gas flow.

In addition, the catalyst L had a specific surface area of 7 m$^2$/g as measured by the BET single-point method, a total pore volume of 0.28 cm$^3$/g as measured by the mercury penetration method, and an average pore diameter of 0.060 μm.

From the result of measurement with a transmission electron microscope, the average particle diameter of Pt was smaller than 5 nm.

EXAMPLE 2-5

A catalyst M was obtained in the same way as of Example 2-1 except that the prepared powder comprising the titanium oxide having an anatase-type crystal structure was replaced with a product as obtained by grinding a mixed powder of a commercially available titanium oxide powder (rutile-type titanium oxide, produced by Fuji Titanium Industries, Co., Ltd.) and an alumina powder (as prepared by a precipitation method) with an air-blow grinder so as to be still finer, and further that the phenol resin was not added when forming the porous honeycomb support, and further that air was removed from the kneaded product in a deaerating tank as placed upstream of the extrusion molding machine.

The composition of the resultant catalyst M was analyzed. As a result, it was TiO$_2$:Al$_2$O$_3$:Pt=57.8:42:0.2 (weight ratio).

The catalyst M had an opening ratio of 67% and compression fracture strengths of 4.6 MPa in a gas flow direction and 1.8 MPa in a direction perpendicular to the gas flow.

In addition, the catalyst M had a specific surface area of 42 m$^2$/g as measured by the BET single-point method, a total pore volume of 0.19 cm$^3$/g as measured by the mercury penetration method, and an average pore diameter of 0.060 μm.

From the result of measurement with a transmission electron microscope, the average particle diameter of Pt was smaller than 5 nm.

EXAMPLE 2-6

A catalyst N was obtained in the same way as of Example 2-1 except that the prepared titanium oxide powder was used after having been ground with an air-blow grinder so as to be still finer, and further that the phenol resin was not added when forming the porous honeycomb support, and further that air was removed from the kneaded product in a deaerating tank as placed upstream of the extrusion molding machine, and further that the calcinations temperature was changed to 800° C., and further that the calcinations time was changed to 12 hours.

The composition of the resultant catalyst N was analyzed. As a result, it was TiO$_2$:Pt=99.8:0.2 (weight ratio).

The catalyst N had an opening ratio of 67% and compression fracture strengths of 4.7 MPa in a gas flow direction and 1.7 MPa in a direction perpendicular to the gas flow.

In addition, the catalyst N had a specific surface area of 18 m$^2$/g as measured by the BET single-point method, a total pore volume of 0.18 cm$^3$/g as measured by the mercury penetration method, and an average pore diameter of 0.031 μm.

From the result of measurement with a transmission electron microscope, the average particle diameter of Pt was smaller than 5 nm.

EXAMPLE 3-1

Production of Porous Honeycomb Support:

To 20 kg of the Ti—Si-composite oxide powder as obtained in Example 1-1, there were added 1 kg of phenol resin, 400 g of starch (as a molding assistant) and 800 g of glass fibers (produced by Asahi Glass Fibers Co., Ltd.; trade name "MF830A"; average diameter=12.5 μm, average length=65 μm, average aspect ratio (average length/average diameter)=5.2) to mix them together. The resulting mixture was kneaded with a kneader and then extrusion-molded with an extrusion molding machine into a honeycomb form having an external form size of 80 mm square, an opening size of 1.76 mm, an inner wall thickness of 0.35 mm, and a length of 500 mm. Thereafter, the resultant form was dried at 80° C. and then calcined at 450° C. for 5 hours under air atmosphere to obtain a porous honeycomb support.

This porous honeycomb support has a latticed structure, as shown in FIG. 1, such that the opening size W of each exhaust gas passageway is 1.76 mm, and that the inner wall thickness T is 0.35 mm, and that the length L is 500 mm.

Production of Catalyst by Supporting Catalytic Components:

The above porous honeycomb support was cut off into a length of 100 mm and then immersed into a mixed solution of hexaammineplatinum hydroxide and magnesium acetate and then dried. Next, the resultant product was calcined at 450° C. for 2 hours under air atmosphere to obtain a catalyst O comprising the porous honeycomb support on which Pt and Mg were supported as the catalytic component A and as the catalytic component B respectively and further in which the glass fibers were contained.

Analysis of Catalyst:

The composition of the resultant catalyst O was analyzed. As a result, it was (Ti—Si-composite oxide):(glass fibers):Mg:Pt=95.1:3.8:1:0.1 (weight ratio).

The catalyst O had an opening ratio of 67% and compression fracture strengths of 3.6 MPa in a gas flow direction and 1.3 MPa in a direction perpendicular to the gas flow.

In addition, the catalyst O had a specific surface area of 115 m$^2$/g as measured by the BET single-point method, a total pore volume of 0.52 cm$^3$/g as measured by the mercury penetration method, and an average pore diameter of 0.016 μm.

From the result of measurement with a transmission electron microscope, the average particle diameter of Pt was smaller than 5 nm.

EXAMPLE 3-2

Production of Porous Honeycomb Support:

The commercially available titanium oxide powder (produced by Millennium Inorganic Chemicals Limited; trade name "DT-51 ") was used as the material of the support similarly to Example 1-4 to produce a porous honeycomb support having the same shape as of Example 3-1 in the following way. Specifically, to 20 kg of the above powder, there were added 1 kg of phenol resin, 400 g of starch (as a molding assistant) and 3.3 kg of silica sol (produced by Nissan Chemical Industries, Ltd.; trade name "Snowtex-30"; with an SiO$_2$ content of about 30 weight %; average particle diameter of silica particles=15 nm) to mix them together. The resulting mixture was kneaded with a kneader and then extrusion-molded with an extrusion molding machine into a honeycomb form having an external form size of 80 mm square, an opening size of 1.76 mm, an inner wall thickness of 0.35 mm, and a length of 500 mm. Thereafter, the resultant form was dried at 80° C. and then calcined at 450° C. for 5 hours under air atmosphere to obtain a porous honeycomb support.

This porous honeycomb support has a latticed structure, as shown in FIG. 1, such that the opening size W of each exhaust gas passageway is 1.76 mm, and that the inner wall thickness T is 0.35 mm, and that the length L is 500 mm.

Production of Catalyst by Supporting Catalytic Components:

The above porous honeycomb support was cut off into a length of 100 mm and then immersed into a hexaammineplatinum hydroxide solution and then dried. Next, the resultant product was calcined at 450° C. for 2 hours under air atmosphere. Next, the calcined product was immersed into an aqueous magnesium acetate solution, and then dried and calcined in the same way as the above, thus obtaining a catalyst P comprising the porous honeycomb support on which Pt and Mg were supported as the catalytic component A and as the catalytic component B respectably and further in which the silica particles were contained.

The composition of the resultant catalyst P was analyzed. As a result, it was $TiO_2:SiO_2$(silica particles):Mg:Pt=94.2: 4.7:1:0.1 (weight ratio).

The catalyst P had an opening ratio of 67% and compression fracture strengths of 5.5 MPa in a gas flow direction and 2.4 MPa in a direction perpendicular to the gas flow.

In addition, the catalyst P had a specific surface area of 80 $m^2/g$ as measured by the BET single-point method, a total pore volume of 0.45 $cm^3/g$ as measured by the mercury penetration method, and an average pore diameter of 0.080 µm.

From the result of measurement with a transmission electron microscope, the average particle diameter of Pt was smaller than 5 nm.

EXAMPLE 3-3

Production of Porous Honeycomb Support:

The commercially available titanium-tungsten oxide (Ti—W oxide; produced by Millennium Inorganic Chemicals Limited; trade name "DT-52"; $TiO_2:WO_3$ 9:1 (weight ratio)) was used as the material of the support to produce a porous honeycomb support having the same shape as of Example 3-1 in the following way. Specifically, to 20 kg of the above powder, there were added 1 kg of phenol resin, 400 g of starch (as a molding assistant) and 800 g of whiskers (produced by Tokai Carbon Co., Ltd.; trade name "Tokawhisker TWS-200"; component of whiskers: silicon carbide; average diameter=0.45 µm, average length=45 µm, average aspect ratio (average length/average diameter)=10) to mix them together. The resulting mixture was kneaded with a kneader and then extrusion-molded with an extrusion molding machine into a honeycomb form having an external form size of 80 mm square, an opening size of 1.76 mm, an inner wall thickness of 0.35 mm, and a length of 500 mm. Thereafter, the resultant form was dried at 80° C. and then calcined at 450° C. for 5 hours under air atmosphere to obtain a porous honeycomb support.

This porous honeycomb support has a latticed structure, as shown in FIG. 1, such that the opening size W of each exhaust gas passageway is 1.76 mm, and that the inner wall thickness T is 0.35 mm, and that the length L is 500 mm.

Production of Catalyst by Supporting Catalytic Components:

The above porous honeycomb support was cut off into a length of 100 mm and then immersed into a mixed aqueous solution of hexaammineplatinum hydroxide and lanthanum acetate, and then dried, and then calcined at 450° C. for 2 hours under air atmosphere to obtain a catalyst Q comprising the porous honeycomb support on which Pt and La were supported as the catalytic component A and as the catalytic component B respectively and further in which the whiskers were contained.

Analysis of Catalyst:

The composition of the resultant catalyst Q was analyzed. As a result, it was (Ti—W oxide):whiskers:La:Pt=95.1:3.8: 1:0.1 (weight ratio).

The catalyst Q had an opening ratio of 67% and compression fracture strengths of 3.5 MPa in a gas flow direction and 1.1 MPa in a direction perpendicular to the gas flow.

In addition, the catalyst Q had a specific surface area of 120 $m^2/g$ as measured by the BET single-point method, a total pore volume of 0.52 $cm^3/g$ as measured by the mercury penetration method, and an average pore diameter of 0.016 µm.

From the result of measurement with a transmission electron microscope, the average particle diameter of Pt was smaller than 5 nm.

EXAMPLE 3-4

Production of Porous Honeycomb Support:

A porous honeycomb support was produced in the same way as of Example 3-1 except that the amount of the glass fibers as added was changed from 800 g to 200 g, and further that 200 g of silica particles (produced by Nippon Aerosil Co., Ltd.; trade name "Aerosil 200"; average diameter=12 nm) were added besides the glass fibers.

Production of Catalyst by Supporting Catalytic Components:

The above porous honeycomb support was cut off into a length of 100 mm and then immersed into a mixed aqueous solution of hexaammineplatinum hydroxide and magnesium acetate, and then dried, and then calcined at 450° C. for 2 hours under air atmosphere to obtain a catalyst R comprising the porous honeycomb support on which Pt and Mg were supported as the catalytic component A and as the catalytic component B respectively and further in which the glass fibers and the silica particles were contained.

Analysis of Catalyst:

The composition of the resultant catalyst R was analyzed. As a result, it was (Ti—Si-composite oxide):(glass fibers): (silica particles):Mg:Pt=96.9:1:1:1:0.1 (weight ratio).

The catalyst R had an opening ratio of 67% and compression fracture strengths of 3.5 MPa in a gas flow direction and 1.2 MPa in a direction perpendicular to the gas flow.

In addition, the catalyst R had a specific surface area of 122 $m^2/g$ as measured by the BET single-point method, a total pore volume of 0.52 $cm^3/g$ as measured by the mercury penetration method, and an average pore diameter of 0.016 µm.

From the result of measurement with a transmission electron microscope, the average particle diameter of Pt was smaller than 5 nm.

EXAMPLE 3-5

Production of Catalyst by Supporting Catalytic Components:

The porous honeycomb support as obtained in Example 3-1 was cut off into a length of 100 mm and then immersed into an aqueous orthophosphoric acid solution, and then dried, and then calcined at 450° C. for 2 hours under air atmosphere. Next, the calcined product was immersed into a mixed solution of an aqueous hexaammineplatinum solution and magnesium acetate, and then dried, and then calcined at 450° C. for 2 hours under air atmosphere to obtain a catalyst S.

Analysis of Catalyst:

The composition of the resultant catalyst S was analyzed. As a result, it was (Ti—Si-composite oxide):(glass fibers):P: Mg:Pt=93.1:3.8:2:1:0.1 (weight ratio).

The catalyst S had an opening ratio of 67% and compression fracture strengths of 3.7 MPa in a gas flow direction and 1.4 MPa in a direction perpendicular to the gas flow.

In addition, the catalyst S had a specific surface area of 110 $m^2/g$ as measured by the BET single-point method, a total pore volume of 0.50 $cm^3/g$ as measured by the mercury penetration method, and an average pore diameter of 0.016 µm.

From the result of measurement with a transmission electron microscope, the average particle diameter of Pt was smaller than 5 nm.

EXAMPLE 4-1

A porous honeycomb support was produced in the same way as of Example 1-1 except that the measurements of the extrusion-molded structure were changed to opening size=2.8 mm. In accordance with the same way as of Example 1-2 except to use the above porous honeycomb support after having cut it off into a length of 20 mm, a catalyst T was obtained by supporting thereon the catalytic components.

The composition of the resultant catalyst T was analyzed. As a result, it was (Ti—Si-composite oxide):Mg:Pt=98.9:1:0.1 (weight ratio) similarly to the catalyst B.

The catalyst T had an opening ratio of 76% and compression fracture strengths of 1.6 MPa in a gas flow direction and 0.4 MPa in a direction perpendicular to the gas flow.

In addition, the catalyst T had a specific surface area of 123 $m^2/g$ as measured by the BET single-point method, a total pore volume of 0.52 $cm^3/g$ as measured by the mercury penetration method, and an average pore diameter of 0.016 μm.

From the result of measurement with a transmission electron microscope, the average particle diameter of Pt was smaller than 5 nm.

EXAMPLE 4-2

A porous honeycomb support was produced in the same way as of Example 2-1 except that the measurements of the extrusion-molded structure were changed to opening size=2.8 mm. In accordance with the same way as of Example 2-1 except to use the above porous honeycomb support after having cut it off into a length of 20 mm, a catalyst U was obtained by supporting the catalytic component on the support.

The composition of the resultant catalyst U was analyzed. As a result, it was $TiO_2$:Pt=99.8:0.2 (weight ratio) similarly to the catalyst I.

The catalyst U had an opening ratio of 76% and compression fracture strengths of 2.3 MPa in a gas flow direction and 0.7 MPa in a direction perpendicular to the gas flow.

In addition, the catalyst U had a specific surface area of 120 $m^2/g$ as measured by the BET single-point method, a total pore volume of 0.39 $cm^3/g$ as measured by the mercury penetration method, and an average pore diameter of 0.035 μm.

From the result of measurement with a transmission electron microscope, the average particle diameter of Pt was smaller than 5 nm.

EXAMPLE 4-3

A porous honeycomb support was obtained in the same way as of Example 3-1 except that the measurements of the extrusion-molded structure were changed to opening size=2.8 mm. In accordance with the same way as of Example 3-1 except to use the above porous honeycomb support after having cut it off into a length of 20 mm, a catalyst V was obtained by supporting the catalytic components on the support.

The composition of the resultant catalyst V was analyzed. As a result, it was (Ti—Si-composite oxide):(glass fibers):Mg:Pt=95.1:3.8:1:0.1 (weight ratio) similarly to the catalyst O.

The catalyst V had an opening ratio of 76% and compression fracture strengths of 2.1 MPa in a gas flow direction and 0.6 MPa in a direction perpendicular to the gas flow.

In addition, the catalyst V had a specific surface area of 115 $m^2/g$ as measured by the BET single-point method, a total pore volume of 0.52 $cm^3/g$ as measured by the mercury penetration method, and an average pore diameter of 0.016 μm.

From the result of measurement with a transmission electron microscope, the average particle diameter of Pt was smaller than 5 nm.

EXAMPLE 4-4

A porous honeycomb support was obtained in the same way as of Example 1-1 except that the measurements of the extrusion-molded structure were changed to opening size=2.8 mm. In accordance with the same way as of Example 1-2, a catalyst W was obtained by supporting the catalytic components on the above porous honeycomb support.

The composition of the resultant catalyst W was analyzed. As a result, it was (Ti—Si-composite oxide):Mg:Pt=98.9:1:0.1 (weight ratio) similarly to the catalyst B.

The catalyst W had an opening ratio of 76% and compression fracture strengths of 2.3 MPa in a gas flow direction and 0.5 MPa in a direction perpendicular to the gas flow.

In addition, the catalyst W had a specific surface area of 123 $m^2/g$ as measured by the BET single-point method, a total pore volume of 0.52 $cm^3/g$ as measured by the mercury penetration method, and an average pore diameter of 0.016 μm.

From the result of measurement with a transmission electron microscope, the average particle diameter of Pt was smaller than 5 nm.

EXAMPLE 4-5

A porous honeycomb support was obtained in the same way as of Example 1-1 except that the measurements of the extrusion-molded structure were changed to opening size=2.8 mm. In accordance with the same process as of Example 1-2 except to use the above porous honeycomb support after having cut it off into a length of 5 mm, a catalyst X was obtained by supporting the catalytic components on the support.

The composition of the resultant catalyst X was analyzed. As a result, it was (Ti—Si-composite oxide):Mg:Pt=98.9:1:0.1 (weight ratio) similarly to the catalyst B.

The catalyst X had an opening ratio of 76% and compression fracture strengths of 0.4 MPa in a gas flow direction and 0.1 MPa in a direction perpendicular to the gas flow.

In addition, the catalyst X had a specific surface area of 123 $m^2/g$ as measured by the BET single-point method, a total pore volume of 0.52 $cm^3/g$ as measured by the mercury penetration method, and an average pore diameter of 0.016 μm.

From the result of measurement with a transmission electron microscope, the average particle diameter of Pt was smaller than 5 nm.

Purification of CO-Containing Exhaust Gases

PURIFICATION EXAMPLE 1

CO-containing exhaust gases were brought into contact with the catalysts A to S (as produced in Examples 1-1 to 1-7, 2-1 to 2-6, and 3-1 to 3-5 and Comparative Example 1-1) under the following purification conditions, thus carrying out CO-removing purification to determine the CO-removing ratio. Incidentally, the above CO-containing exhaust gases are exhaust gases further containing acetaldehyde.

<CO- and acetaldehyde-removing purification>:
Purification conditions:
 Composition of exhaust gases =
  CO: 20 ppm, $CH_3CHO$: 20 ppm, $O_2$: 12%, $H_2O$: 8%, $N_2$: Balance
 Gas temperature = 360° C.
 Space velocity (STP) = 110,000 $H^{-1}$
 Gas linear velocity = 6.9 m/s
CO-removing ratio calculation equation:
 CO-removing ratio (%) =
 [{(CO concentration at inlet of reactor) − (CO concentration at outlet of reactor) }/
  (CO concentration at inlet of reactor)] × 100
Acetaldehyde-removing ratio calculation equation:
 Acetaldehyde-removing ratio (%) =
  [{(acetaldehyde concentration at inlet of reactor) −
   (acetaldehyde concentration at outlet of reactor)}/
   (acetaldehyde concentration at inlet of reactor)] × 100

The results of the above purification of the CO-containing exhaust gases and the details of the structures and properties of the catalysts as used for purification of CO-containing exhaust gases are collectively shown in Tables 1 to 3 below.

TABLE 1

| Catalysts | | Shape of catalysts | | | | Compression fracture strengths (MPa) | | Specific surface area ($m^2$g) | Total pore volume ($cm^3$/g) |
| | | Inner Opening size (mm) | Opening ratio (%) | wall thickness (mm) | Length in gas flow direction (mm) | Gas flow direction | Direction perpendicular to gas flow | | |
|---|---|---|---|---|---|---|---|---|---|
| Example 1-1 | A | 1.76 | 67 | 0.35 | 100 | 2.9 | 0.88 | 130 | 0.53 |
| Example 1-2 | B | 1.76 | 67 | 0.35 | 100 | 3.0 | 0.91 | 123 | 0.52 |
| Example 1-3 | C | 2.34 | 74 | 0.35 | 100 | 2.5 | 0.58 | 130 | 0.53 |
| Example 1-4 | D | 1.76 | 67 | 0.35 | 100 | 4.9 | 1.8 | 75 | 0.45 |
| Example 1-5 | E | 1.76 | 67 | 0.35 | 100 | 4.8 | 1.7 | 80 | 0.45 |
| Example 1-6 | F | 1.76 | 67 | 0.35 | 100 | 3.0 | 0.9 | 120 | 0.5 |
| Example 1-7 | G | 1.76 | 67 | 0.35 | 100 | 4.4 | 1.6 | 150 | 0.40 |
| Comparative Example 1-1 | H | 4.55 | 83 | 0.4 | 100 | 0.49 | 0.11 | 130 | 0.53 |

| Catalysts | | Average pore diameter (μm) | Gas temperature (° C.) | Pressure drop ($mmH_2O$) | Linear velocity (m/s) | CO-removing ratio (%) | Acetaldehyde-removing ratio (%) |
|---|---|---|---|---|---|---|---|
| Example 1-1 | A | 0.016 | 360 | 28 | 6.9 | 92 | 78 |
| Example 1-2 | B | 0.016 | 360 | 28 | 6.9 | 94 | 81 |
| Example 1-3 | C | 0.016 | 360 | 15 | 6.9 | 86 | 72 |
| Example 1-4 | D | 0.08 | 360 | 28 | 6.9 | 91 | 77 |
| Example 1-5 | E | 0.08 | 360 | 28 | 6.9 | 93 | 80 |
| Example 1-6 | F | 0.016 | 360 | 28 | 6.9 | 95 | 84 |
| Example 1-7 | G | 0.012 | 360 | 28 | 6.9 | 88 | 75 |
| Comparative Example 1-1 | H | 0.016 | 360 | 4 | 6.9 | 66 | 47 |

TABLE 2

| Catalysts | | Shape of catalysts | | | | Compression fracture strengths (MPa) | | Specific surface area ($m^2$g) | Total pore volume ($cm^3$/g) |
| | | Inner Opening size (mm) | Opening ratio (%) | wall thickness (mm) | Length in gas flow direction (mm) | Gas flow direction | Direction perpendicular to gas flow | | |
|---|---|---|---|---|---|---|---|---|---|
| Example 2-1 | I | 1.76 | 67 | 0.35 | 100 | 4.9 | 1.8 | 120 | 0.39 |
| Example 2-2 | J | 1.76 | 67 | 0.35 | 100 | 4.9 | 1.8 | 25 | 0.34 |
| Example 2-3 | K | 1.76 | 67 | 0.35 | 100 | 4.8 | 1.7 | 83 | 0.30 |
| Example 2-4 | L | 1.76 | 67 | 0.35 | 100 | 4.4 | 1.3 | 7 | 0.28 |
| Example 2-5 | M | 1.76 | 67 | 0.35 | 100 | 4.6 | 1.8 | 42 | 0.19 |
| Example 2-6 | N | 1.76 | 67 | 0.35 | 100 | 4.7 | 1.7 | 18 | 0.18 |

TABLE 2-continued

| Catalysts | | Average pore diameter (μm) | Gas temperature (° C.) | Pressure drop (mmH₂O) | Linear velocity (m/s) | CO-removing ratio (%) | Acetaldehyde-removing ratio (%) |
|---|---|---|---|---|---|---|---|
| Example 2-1 | I | 0.035 | 360 | 28 | 6.9 | 92 | 78 |
| Example 2-2 | J | 0.031 | 360 | 28 | 6.9 | 84 | 70 |
| Example 2-3 | K | 0.017 | 360 | 28 | 6.9 | 91 | 74 |
| Example 2-4 | L | 0.060 | 360 | 28 | 6.9 | 76 | 57 |
| Example 2-5 | M | 0.060 | 360 | 28 | 6.9 | 78 | 60 |
| Example 2-6 | N | 0.031 | 360 | 28 | 6.9 | 75 | 65 |

TABLE 3

| | | Shape of catalysts | | | | | | |
|---|---|---|---|---|---|---|---|---|
| | | | | | Compression fracture strengths (MPa) | | | |
| | | | | Length in gas | | | Specific | |
| | | Opening size (mm) | Opening ratio (%) | Inner wall thickness (mm) | flow direction (mm) | Gas flow direction | Direction perpendicular to gas flow | surface area (m²g) | Total pore volume (cm³/g) |
| Catalysts | | | | | | | | | |
| Example 3-1 | O | 1.76 | 67 | 0.35 | 100 | 3.6 | 1.3 | 115 | 0.52 |
| Example 3-2 | P | 1.76 | 67 | 0.35 | 100 | 5.5 | 2.4 | 80 | 0.45 |
| Example 3-3 | Q | 1.76 | 67 | 0.35 | 100 | 3.5 | 1.1 | 120 | 0.52 |
| Example 3-4 | R | 1.76 | 67 | 0.35 | 100 | 3.5 | 1.2 | 122 | 0.52 |
| Example 3-5 | S | 1.76 | 67 | 0.35 | 100 | 3.7 | 1.4 | 110 | 0.50 |

| Catalysts | | Average pore diameter (μm) | Gas temperature (° C.) | Pressure drop (mmH₂O) | Linear velocity (m/s) | CO-removing ratio (%) | Acetaldehyde-removing ratio (%) |
|---|---|---|---|---|---|---|---|
| Example 3-1 | O | 0.016 | 360 | 28 | 6.9 | 94 | 81 |
| Example 3-2 | P | 0.08 | 360 | 28 | 6.9 | 93 | 81 |
| Example 3-3 | Q | 0.016 | 360 | 28 | 6.9 | 94 | 81 |
| Example 3-4 | R | 0.016 | 360 | 28 | 6.9 | 94 | 81 |
| Example 3-5 | S | 0.016 | 360 | 28 | 6.9 | 95 | 80 |

From the above results, it was verified that the catalysts of the Examples can display very excellent CO-removal efficiency when compared with those of the Comparative Examples. Also as to the acetaldehyde-removal efficiency, the catalysts of the Examples are understood as very excellent when compared with those of the Comparative Examples.

PURIFICATION EXAMPLE 2

CO-containing exhaust gases were brought into contact with the catalysts B, I and O (as produced in Examples 1-2, 2-1 and 3-1) under the following purification conditions, thus carrying out CO-removing purification to determine the CO-removing ratio. Incidentally, as to each of the catalysts B, I and O, the purification was carried out both at a space velocity of 550,000 H$^{-1}$ (a gas linear velocity of 35 m/s) and at a space velocity of 265,000 H$^{-1}$ (a gas linear velocity of 17 m/s).

<CO-Removing Purification>:

Purification conditions:

Composition of exhaust gases=CO: 20 ppm, O$_2$: 12%, H$_2$O: 8%, N$_2$: Balance

Gas temperature=360° C.

Space velocity (STP)=550,000 H$^{-1}$ or 265,000 H$^{-1}$

Gas linear velocity=35 m/s or 17 m/s

CO-removing ratio calculation equation:

$$\text{CO-removing ratio}(\%) = [\{(\text{CO concentration at inlet of reactor}) - (\text{CO concentration at outlet of reactor})\} / (\text{CO concentration at inlet of reactor})] \times 100$$

Incidentally, in Purification Example 2, the CO-removing purification was carried out at a gas flow rate (space velocity) as increased in order to increase the linear velocity of the exhaust gases as compared with the above Purification Example 1.

The results of the above purification of the CO-containing exhaust gases are collectively shown in Table 4 below.

TABLE 4

| Catalysts | | Gas temperature (° C.) | Pressure drop (mmH₂O) | Linear velocity (m/s) | CO-removing ratio (%) |
|---|---|---|---|---|---|
| Example 1-2 | B | 360 | 144 | 35 | 44 |
| | | | 70 | 17 | 68 |
| Example 2-1 | I | 360 | 144 | 35 | 40 |
| | | | 70 | 17 | 63 |
| Example 3-1 | O | 360 | 144 | 35 | 44 |
| | | | 70 | 17 | 68 |

From the above results, it was recognized that the efficiency of the purification (CO-removing ratio) decreased remarkably when the purification of the CO-containing exhaust gases was carried out under the purification conditions where the linear velocity of the exhaust gases or the pressure drop deviated from the aforementioned specific ranges.

PURIFICATION EXAMPLE 3

CO-containing exhaust gases were brought into contact with the catalysts T to X (as produced in Examples 4-1 to 4-5) under the following purification conditions, thus carrying out CO-removing purification to determine the CO-removing ratio.
<CO-Removing Purification>
Purification conditions:
Composition of exhaust gases=CO: 20 ppm, $O_2$: 12%, $H_2O$: 8%, $N_2$: Balance
Gas temperature=360° C.
Space velocity (STP)=110,000 $H^{-1}$
Gas linear velocity=0.35 to 6.9 m/s (refer to Table 5 below)
CO-removing ratio calculation equation:

CO-removing ratio(%) = [{(CO concentration at inlet of reactor) −

(CO concentration at outlet of reactor)}/

(CO concentration at inlet of reactor)] × 100

Incidentally, in Purification Example 3, the CO-removing purification was carried out under conditions where there were made settings to fitly change the surface of a cross section vertical to the exhaust gas flow direction and/or the length in the exhaust gas flow direction as to the catalysts as used (but the volumes of the catalysts were constant) in order to equalize the space velocity of the exhaust gases to that in the above Purification Example 1, but to make differences in liner velocity of the exhaust gases from that in the above Purification Example 1.

The results of the above purification of the CO-containing exhaust gases are collectively shown in Table 5 below.

From the above results, it is understood that, if the linear velocity is made small, then the pressure drop can be suppressed to still lower, whereas the CO-removing ratio decreases much. It can be considered that this decrease of the CO-removing ratio accompanying the above decrease of the linear velocity results from that the gas fluid film diffusion resistance of the surface of the catalyst increases in proportion as the linear velocity becomes smaller. Accordingly, it is understood that, if the linear velocity is made too small in order to decrease the pressure drop, then there is a case where a remarkable decrease of the CO-removing ratio is caused.

EXAMPLE 5-1

CO— and $NO_x$-removing purification was carried out in the following way. In an apparatus for purification of exhaust gases, the catalyst B as obtained in Example 1-2 was placed on the gas inlet side in an exhaust gas flow direction, and a vanadium-tungsten-containing $DeNO_x$ catalyst was placed on the gas outlet side. While $NH_3$ was supplied as a reducing agent from between the catalyst B and the $DeNO_x$ catalyst into the apparatus in the below-mentioned used amount, exhaust gases containing CO and NO were passed through the catalyst layers.

Before and after the above purification, the exhaust gases were analyzed to measure the CO-removing ratio, the NO-removing ratio, and the $NH_3$-remaining ratio. The results are shown in Table 6. Incidentally, the specific purification conditions and the calculation equations are shown below.

EXAMPLE 5-2

CO— and $NO_x$-removing purification was carried out in the following way. In an apparatus for purification of exhaust gases, a vanadium-tungsten-containing $DeNO_x$ catalyst was placed on the gas inlet side in an exhaust gas flow direction, and the catalyst B as obtained in Example 1-2 was placed on the gas outlet side. While $NH_3$ was supplied as a reducing agent from upstream of the $DeNO_x$ catalyst into the apparatus in the below-mentioned used amount, exhaust gases containing CO and NO were passed through the catalyst layers.

TABLE 5

| Catalysts | | Shape of catalysts | | | | Compression fracture strengths (MPa) | | Specific surface area ($m^2$g) |
|---|---|---|---|---|---|---|---|---|
| | | Opening size (mm) | Opening ratio (%) | Inner wall thickness (mm) | Length in gas flow direction (mm) | Gas flow direction | Direction perpendicular to gas flow | |
| Example 4-1 | T | 2.8 | 76 | 0.35 | 20 | 1.6 | 0.4 | 123 |
| Example 4-2 | U | 2.8 | 76 | 0.35 | 20 | 2.3 | 0.7 | 120 |
| Example 4-3 | V | 2.8 | 76 | 0.35 | 20 | 2.1 | 0.6 | 115 |
| Example 4-4 | W | 2.8 | 76 | 0.35 | 100 | 2.3 | 0.5 | 123 |
| Example 4-5 | X | 2.8 | 76 | 0.35 | 5 | 0.4 | 0.1 | 123 |

| Catalysts | | Total pore volume ($cm^3$/g) | Average pore diameter (μm) | Gas temperature (° C.) | Pressure drop ($mmH_2O$) | Linear velocity (m/s) | CO-removing ratio (%) |
|---|---|---|---|---|---|---|---|
| Example 4-1 | T | 0.52 | 0.016 | 360 | 0.5 | 1.4 | 82 |
| Example 4-2 | U | 0.39 | 0.035 | 360 | 0.5 | 1.4 | 78 |
| Example 4-3 | V | 0.52 | 0.016 | 360 | 0.5 | 1.4 | 82 |
| Example 4-4 | W | 0.52 | 0.016 | 360 | 11 | 6.9 | 86 |
| Example 4-5 | X | 0.52 | 0.016 | 360 | 0.03 | 0.35 | 67 |

Before and after the above purification, the exhaust gases were analyzed, in the same way as of Example 5-1, to measure the CO-removing ratio, the NO-removing ratio, and the NH$_3$-remaining ratio. The results are shown in Table 6.

<CO— and NO$_x$-Removing Purification>:

Purification conditions:

Composition of exhaust gases=CO: 20 ppm, NO: 20 ppm, H$_2$O: 8%, O$_2$: 10%, N$_2$: Balance Gas temperature=350° C.

Space velocity (STP) at catalyst B=75,000 H$^{-1}$

Space velocity (STP) at DeNO$_x$ catalyst=12,000 H$^{-1}$

Amount of reducing agent (ammonia: NH$_3$) as used=1.0 (NH$_3$/NO (molar ratio))

CO-removing ratio calculation equation:

$$\text{CO-removing ratio}(\%) = [\{(\text{CO concentration at inlet of reactor}) - (\text{CO concentration at outlet of reactor})\}/(\text{CO concentration at inlet of reactor})] \times 100$$

NO-removing ratio calculation equation:

$$\text{NO-removing ratio}(\%) = [\{(\text{NO concentration at inlet of reactor}) - (\text{NO concentration at outlet of reactor})\}/(\text{NO concentration at inlet of reactor})] \times 100$$

NH$_3$-remaining ratio calculation equation:

$$\text{NH}_3\text{-remaining ratio}(\%) = \{(\text{NH}_3 \text{ concentration at outlet of reactor})/(\text{NH}_3 \text{ concentration at inlet of reactor})\} \times 100$$

TABLE 6

| | Arrangement of catalysts | CO-removing ratio (%) | NO-removing ratio (%) | NH$_3$-remaining ratio (%) |
|---|---|---|---|---|
| Example 5-1 | Catalyst B ⇒ DeNO$_x$ catalyst | 95 | >99 | 0 |
| Example 5-2 | DeNO$_x$ catalyst ⇒ Catalyst B | 95 | >99 | 0 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for purification of exhaust gases from gas turbines, which is a process for purification of exhaust gases to remove CO therefrom, being characterized by comprising the step of bringing the exhaust gases into contact with a catalyst layer at a temperature of 250 to 600° C., a pressure drop of not more than 100 mmH$_2$O, and a linear velocity of 0.5 to 10 m/s, wherein the catalyst layer includes a porous honeycomb-structural catalyst having an opening size of 1.0 to 3.0 mm, an opening ratio of 60 to 80%, a total pore volume of 0.20 to 0.80 cm$^3$/g as measured by the mercury penetration method, an average pore diameter of 0.010 to 0.50 μm, a specific surface area of not less than 20 m$^2$/g as measured by the BET method, and an inner wall thickness of 0.1 to 0.5 mm and where said porous honeycomb-structural catalyst consists essentially of a calcined porous honeycomb support and a catalytic component, and said porous honeycomb-structural catalyst is obtained by a process including the steps of extrusion-molding materials of the support; calcining the extrusion-molded materials of the support in the temperature range of 200 to 600° C. to obtain said calcined porous honeycomb support having porous inner surfaces and porous outer surfaces; and thereafter supporting said catalytic component directly onto said inner and outer surfaces of said calcined porous honeycomb support.

2. A process according to claim 1, wherein the porous honeycomb support has a length of 25 to 300 mm in a gas flow direction, and wherein the catalytic component includes a catalytic component A supported in the porous honeycomb support wherein the catalytic component A includes at least one noble metal element selected from the group consisting of Pt, Pd, Rh, Ru, Ir, and Au.

3. A process according to claim 2, wherein the catalytic component in the catalyst further includes a catalytic component B supported in the porous honeycomb support wherein the catalytic component B includes at least one metal element as included in groups 1 to 3 in a periodic table.

4. A process according to claim 2, wherein the catalytic component in the catalyst further includes a catalytic component C supported in the porous honeycomb support wherein the catalytic component C includes at least one element selected from the group consisting of V, W, Mo, Cu, Mn, Ni, Co, Cr, and Fe.

5. A process according to claim 1, wherein the porous honeycomb support includes a titanium-containing oxide.

6. A process according to claim 5, wherein the titanium-containing oxide has an anatase type crystal structure.

7. A process according to claim 5, wherein the titanium-containing oxide includes titanium oxide and/or a composite oxide of Ti and at least one metal element selected from the group consisting of Si, Al, W, and Zr.

8. A process according to claim 1, wherein the catalyst has a compression fracture strength of not less than 0.3 MPa.

9. A process according to claim 1, wherein the catalyst further includes a compound of at least one element selected from the group consisting of P, B, Sb, Pb, Sn, Zn, and In in the range of not more than 10 weight % in terms of atom of the selected element relative to the entity of the catalyst.

10. A process according to claim 1, wherein the catalyst further includes at least one member selected from the group consisting of glass fibers, whiskers, and silica particles.

11. A process according to claim 1, wherein the exhaust gases further contains NO$_x$.

12. A process according to claim 11, further comprising the step of bringing the exhaust gases into contact with a catalyst for removal of nitrogen oxides in the presence of a reducing agent before and/or after the step of bringing the exhaust gases into contact with the catalyst layer.

13. A process according to claim 1, wherein the exhaust gases are exhaust gases having a CO concentration of not higher than 100 ppm.

14. A process according to claim 1, wherein the catalytic component is supported onto the porous honeycomb support by impregnating the porous honeycomb support with a solution containing the catalytic component.

* * * * *

UNITED STATES PATENT AND TRADEMARK OFFICE
CERTIFICATE OF CORRECTION

Page 1 of 1

PATENT NO. : 7,740,819 B2
APPLICATION NO. : 10/354201
DATED : June 22, 2010
INVENTOR(S) : Atsushi Morita et al.

It is certified that error appears in the above-identified patent and that said Letters Patent is hereby corrected as shown below:

On the title page item (73), delete "Tokyo (JP)" and insert --Osaka (JP)--.

Signed and Sealed this
Nineteenth Day of July, 2011

David J. Kappos
*Director of the United States Patent and Trademark Office*